US012479203B2

(12) United States Patent
Nakase et al.

(10) Patent No.: US 12,479,203 B2
(45) Date of Patent: Nov. 25, 2025

(54) LIQUID EJECTION APPARATUS AND CONTROL METHOD THEREFOR

(71) Applicant: BROTHER KOGYO KABUSHIKI KAISHA, Nagoya (JP)

(72) Inventors: Takafumi Nakase, Nagoya (JP); Nobumasa Tanaka, Nagoya (JP); Ryuji Horata, Gamagori (JP); Masahiro Hayashi, Anjo (JP); Zenichiro Sasaki, Nagoya (JP); Kenta Horade, Tokai (JP); Isao Kubo, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 89 days.

(21) Appl. No.: 18/522,656

(22) Filed: Nov. 29, 2023

(65) Prior Publication Data

US 2024/0181772 A1 Jun. 6, 2024

(30) Foreign Application Priority Data

Dec. 6, 2022 (JP) ................................ 2022-194653

(51) Int. Cl.
*B41J 2/045* (2006.01)
*B41J 2/165* (2006.01)

(52) U.S. Cl.
CPC ....... *B41J 2/04541* (2013.01); *B41J 2/04586* (2013.01); *B41J 2/1652* (2013.01)

(58) Field of Classification Search
CPC ............... B41J 2/04541; B41J 2/04588; B41J 2/04593; B41J 2/04586; B41J 2/04596; B41J 2/0451; B41J 2/04551; B41J 2/1652
See application file for complete search history.

(56) References Cited

U.S. PATENT DOCUMENTS

| | | | | |
|---|---|---|---|---|
| 2007/0139461 | A1 | 6/2007 | Izuo | |
| 2014/0300657 | A1 | 10/2014 | Ike | |
| 2020/0276807 | A1 | 9/2020 | Sasaki et al. | |
| 2021/0094275 | A1* | 4/2021 | Takasaki | B41J 2/04573 |

FOREIGN PATENT DOCUMENTS

| | | | |
|---|---|---|---|
| JP | 2007152889 | A | 6/2007 |
| JP | 2014200982 | A | 10/2014 |
| JP | 2020138403 | A | 9/2020 |
| JP | 2022131463 | A | 9/2022 |

* cited by examiner

*Primary Examiner* — Thinh H Nguyen
(74) *Attorney, Agent, or Firm* — Scully, Scott, Murphy & Presser, PC

(57) ABSTRACT

There is provided a liquid ejection apparatus including: a liquid ejection head; a signal outputter configured to output an ejection state signal; and a controller. The ejection state signal is a first or second ejection state signal, the first ejection state signal fulfills a first condition regarding a maximum value and/or a minimum value in a first period and does not fulfill a second condition regarding the maximum value and/or the minimum value in a second period after the first period; the second ejection state signal does not fulfill the first condition in the first period and fulfills the second condition in the second period. The controller is configured to vary a process to be performed between a case in which the ejection state signal outputted is the first ejection state signal and a case in which the ejection state signal outputted is the second ejection state signal.

21 Claims, 22 Drawing Sheets

LIQUID EJECTION APPARATUS AND CONTROL METHOD THEREFOR

REFERENCE TO RELATED APPLICATIONS

This application claims priority from Japanese Patent Application No. 2022-194653 filed on Dec. 6, 2022. The entire content of the priority application is incorporated herein by reference.

BACKGROUND ART

Printers which perform the recording by ejecting (discharging) an ink from nozzles are known, as an example of the liquid ejection apparatus which ejects (discharges) the liquid from the nozzles. In some of such printers, when the ink is ejected from the nozzle toward an electrode in a state in which a high voltage is applied to the electrode by means of a high voltage power source, a signal, which depends on the change of the voltage on the electrode, is outputted from a signal processing circuit. Then, in such printers, the driving for inspection is performed in order to cause an ink-jet head to eject the ink from the nozzle, and it is determined whether or not the nozzle involves any abnormality regarding the ejection of the ink based on the maximum value, provided in a first period, of a signal outputted from the signal processing circuit in this procedure. The first period is a period in which it is assumed that the signal outputted from the signal processing circuit is maximized when the ink is normally ejected from the nozzle.

DESCRIPTION

In the printer described in Japanese Patent Application Laid-open No. 2022-131463, for example, if the viscosity of the ink contained in the nozzle is raised, the time is prolonged, which is required until the ink is ejected from the nozzle after the start of the driving for inspection. In this situation, the period, in which the value of the signal outputted from the signal processing circuit is maximized, is delayed in some cases as compared with the first period. Further, in this situation, the maximum value is not provided in the first period, and the nozzle is determined to be the abnormal nozzle, although the ink is ejected from the nozzle.

An object of the present disclosure is to provide a liquid ejection apparatus, and a control method for a liquid ejection apparatus capable of executing appropriate process.

According to a first aspect of the present disclosure, there is provided a liquid ejection apparatus including:

- a liquid ejection head which has a nozzle and which is configured to eject a liquid from the nozzle;
- a signal outputter configured to output an ejection state signal corresponding to an ejection state of the nozzle in a case that ejection driving for ejecting the liquid from the nozzle is performed in the liquid ejection head; and
- a controller, wherein:
  - the ejection state signal, outputted from the signal outputter, is a first ejection state signal or a second ejection state signal, depending on the ejection state of the nozzle, the first ejection state signal being a signal which fulfills a first condition regarding a maximum value and/or a minimum value of the ejection state signal in a first period and which does not fulfill a second condition regarding the maximum value and/or the minimum value of the ejection state signal in a second period after the first period; the second ejection state signal being a signal which does not fulfill the first condition in the first period and which fulfills the second condition in the second period; and
- the controller is configured to:
  - cause the liquid ejection head to perform the ejection driving; and
- vary a process to be performed after the ejection driving between a case in which the ejection state signal outputted in a case that the ejection driving is performed is the first ejection state signal and a case in which the ejection state signal outputted in the case that the ejection driving is performed is the second ejection state signal.

For example, if the ejection state signal, which is outputted when the ejection state of the liquid from the nozzle is the normal state, is the first ejection state signal, then the ejection state signal, which is outputted when the ejection state is the abnormal state including, for example, a high viscosity abnormal state in which the viscosity of the liquid contained in the nozzle is high and/or a deviation abnormal state in which the ejecting direction of the liquid is deviated, is the second ejection state signal. In the present disclosure, the processes to be performed thereafter are varied between the case in which the ejection state signal outputted in a case that the ejection driving is performed is the first ejection state signal and the case in which the ejection state signal outputted in a case that the ejection driving is performed is the second ejection state signal. Accordingly, it is possible to execute the appropriate process depending on whether the ejection state is the normal state or the abnormal state including, for example, the high viscosity abnormal state and/or the deviation abnormal state.

According to a second aspect of the present disclosure, there is provided a control method for a liquid ejection apparatus,

- the liquid ejection apparatus including:
- a liquid ejection head which has a nozzle and which is configured to eject a liquid from the nozzle; and
- a signal outputter configured to output an ejection state signal corresponding to an ejection state of the nozzle in a case that ejection driving for ejecting the liquid from the nozzle is performed in the liquid ejection head;
- the method including:
- causing the liquid ejection head to perform the ejection driving; and
- varying a process to be performed after the ejection driving between a case in which the ejection state signal outputted in a case that the ejection driving is performed is a first ejection state signal and a case in which the ejection state signal outputted in the case that the ejection driving is performed is a second ejection state signal, the first ejection state signal being a signal which fulfills a first condition regarding a maximum value and/or a minimum value of the ejection state signal in a first period and which does not fulfill a second condition regarding the maximum value and/or the minimum value of the ejection state signal in a second period after the first period; the second ejection state signal being a signal which does not fulfill the first condition in the first period and which fulfills the second condition in the second period.

According to a third aspect of the present disclosure, there is provided a liquid ejection apparatus including:

- a liquid ejection head which has a nozzle and which is configured to eject a liquid from the nozzle;

a signal outputter configured to output an ejection state signal corresponding to an ejection state of the nozzle in a case that ejection driving for ejecting the liquid from the nozzle is performed in the liquid ejection head; and a controller, wherein:

the ejection state signal, outputted from the signal outputter, is a first ejection state signal or a second ejection state signal, depending on the ejection state of the nozzle, the first ejection state signal being a signal which fulfills a first condition regarding a maximum value and/or a minimum value of the ejection state signal in a first period and which does not fulfill a second condition regarding the maximum value and/or the minimum value of the ejection state signal in a second period after the first period; the second ejection state signal being a signal which does not fulfill the first condition in the first period and which fulfills the second condition in the second period; and the controller is configured to:

cause the liquid ejection head to perform the ejection driving;

determine whether the ejection state signal outputted in a case that the ejection driving is performed is the first ejection state signal or the second ejection state signal; and determine that the ejection state of the nozzle is a normal state in a case that the ejection state signal outputted in the case that the ejection driving is performed is determined to be the first ejection state signal, and that the ejection state of the nozzle is an abnormal state in a case that the ejection state signal outputted in the case that the ejection driving is performed is determined to be the second ejection state signal.

Figure 3A:
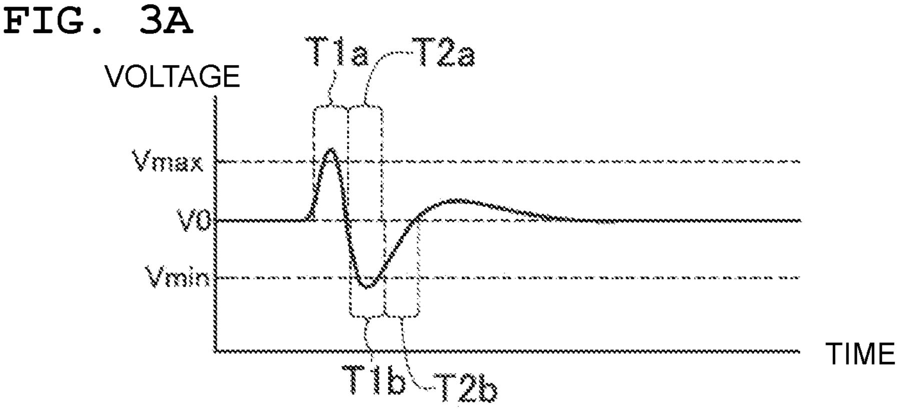
Figure 3B:
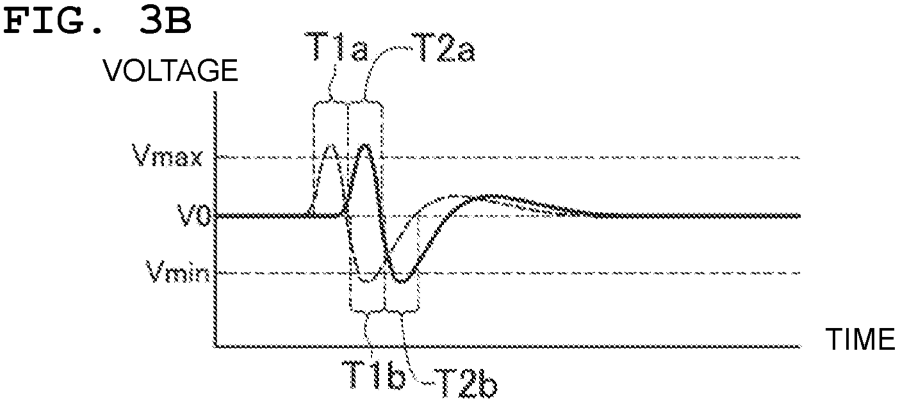
Figure 3C:
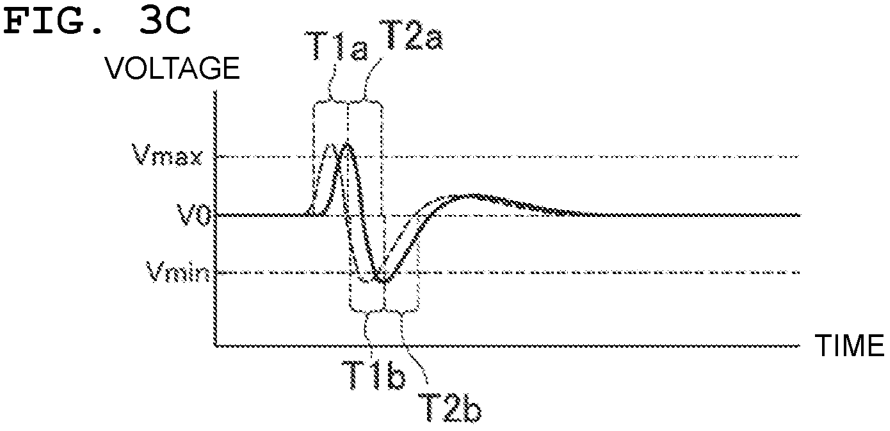
Figure 3D:
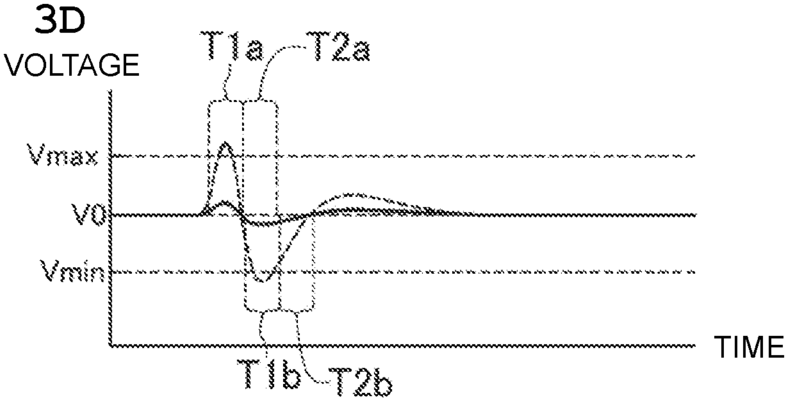

FIG. 3A is a drawing illustrative of the ejection state signal outputted when the ejection state is a normal state, FIG. 3B is a drawing illustrative of the ejection state signal outputted when the ejection state is a first high viscosity abnormal state, FIG. 3C is a drawing illustrative of the ejection state signal outputted when the ejection state is a second high viscosity abnormal state, and FIG. 3D is a drawing illustrative of the ejection state signal outputted when the ejection state is an ejection amount abnormal state.

Figure 4:
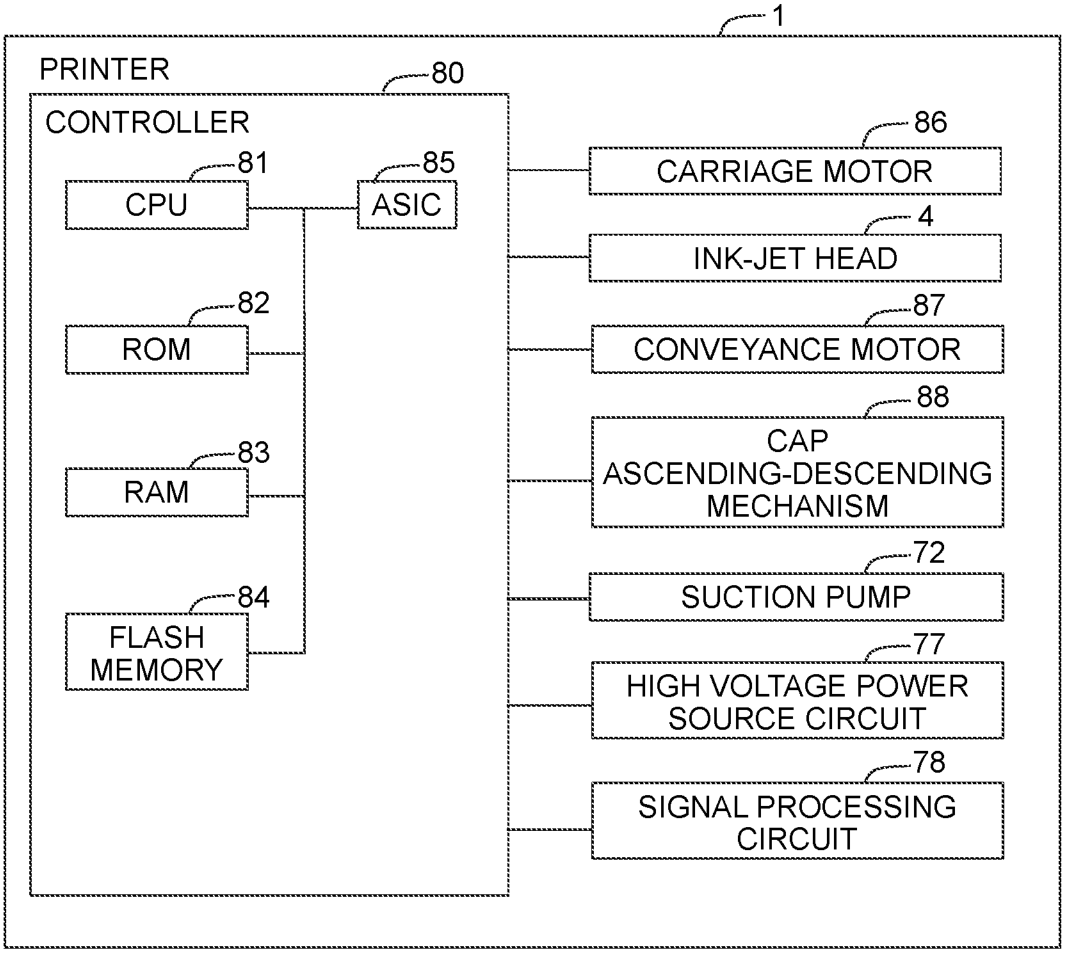

FIG. 4 is a block diagram depicting electric configuration of the printer.

Figure 5:
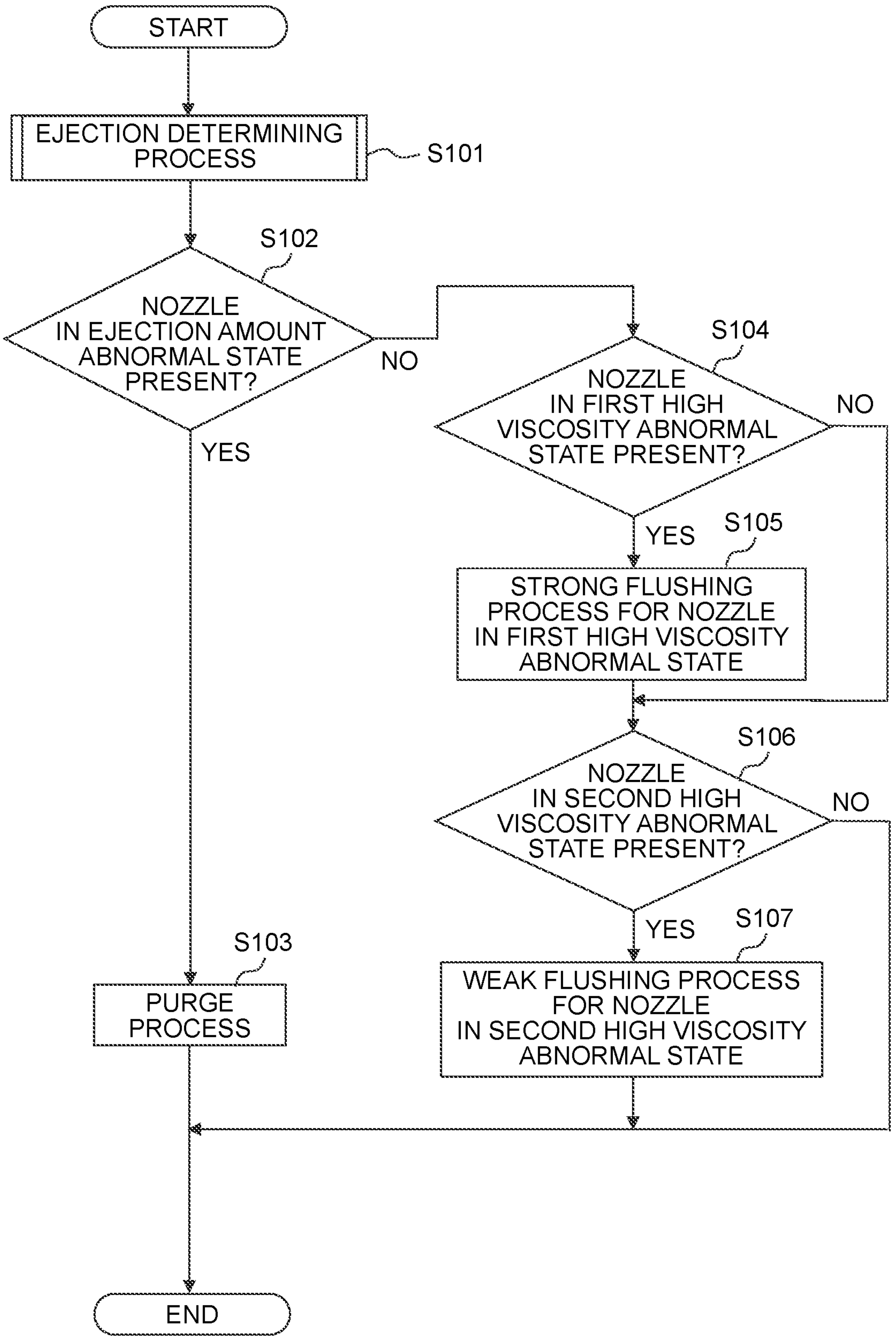

FIG. 5 is a flow chart depicting the flow of the determining of the ejection state and processes to be performed thereafter.

Figure 6A:
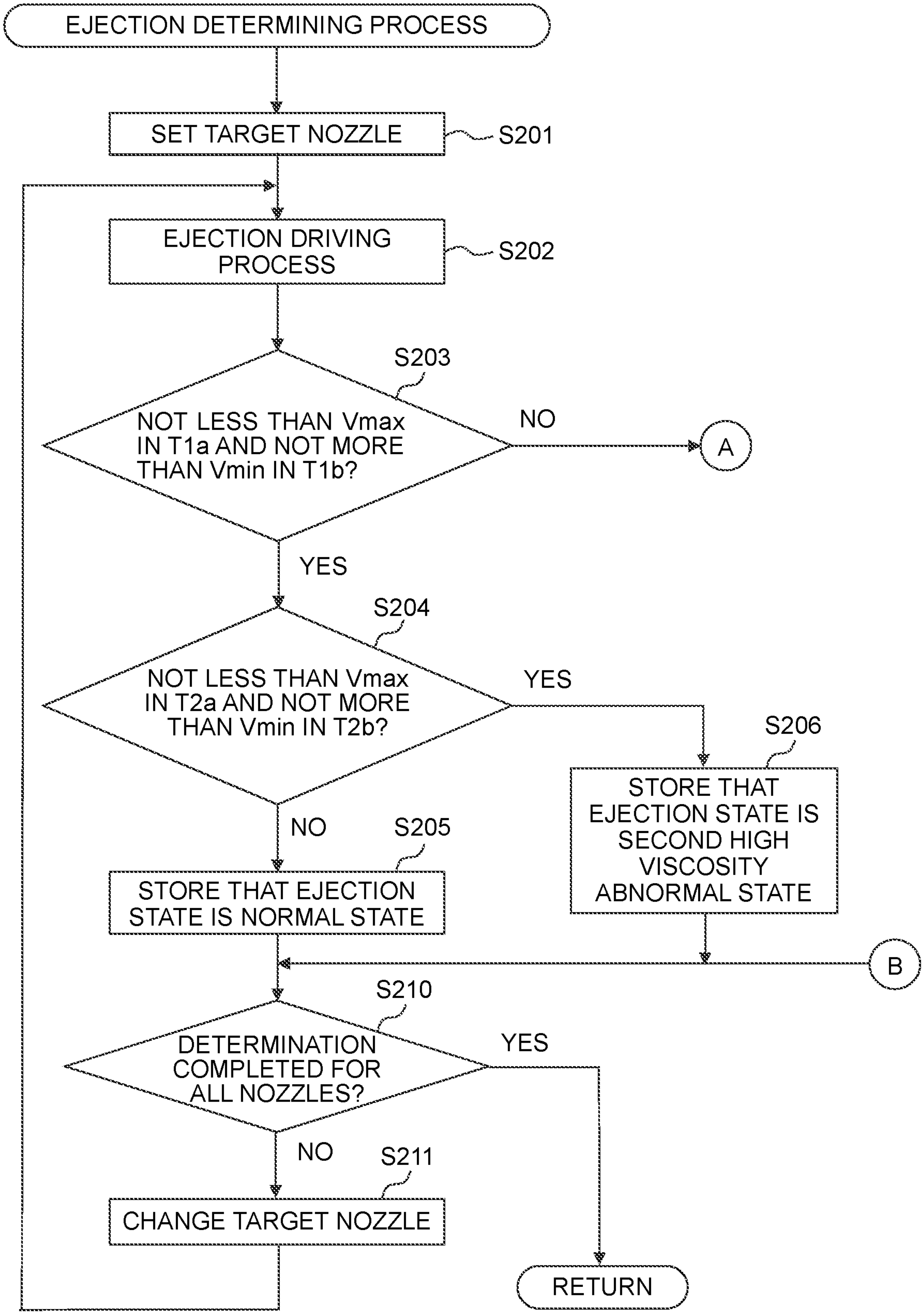
Figure 6B:
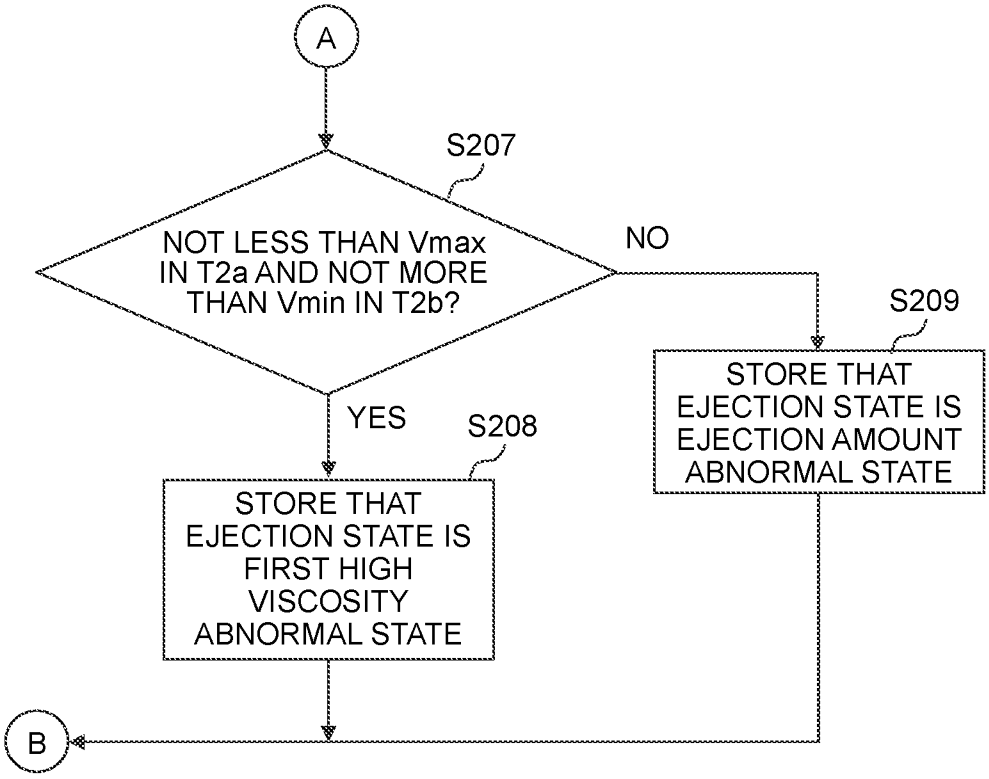

FIGS. 6A and 6B are each a part of a flow chart depicting the flow of the ejection determining process depicted in FIG. 5.

Figure 7:
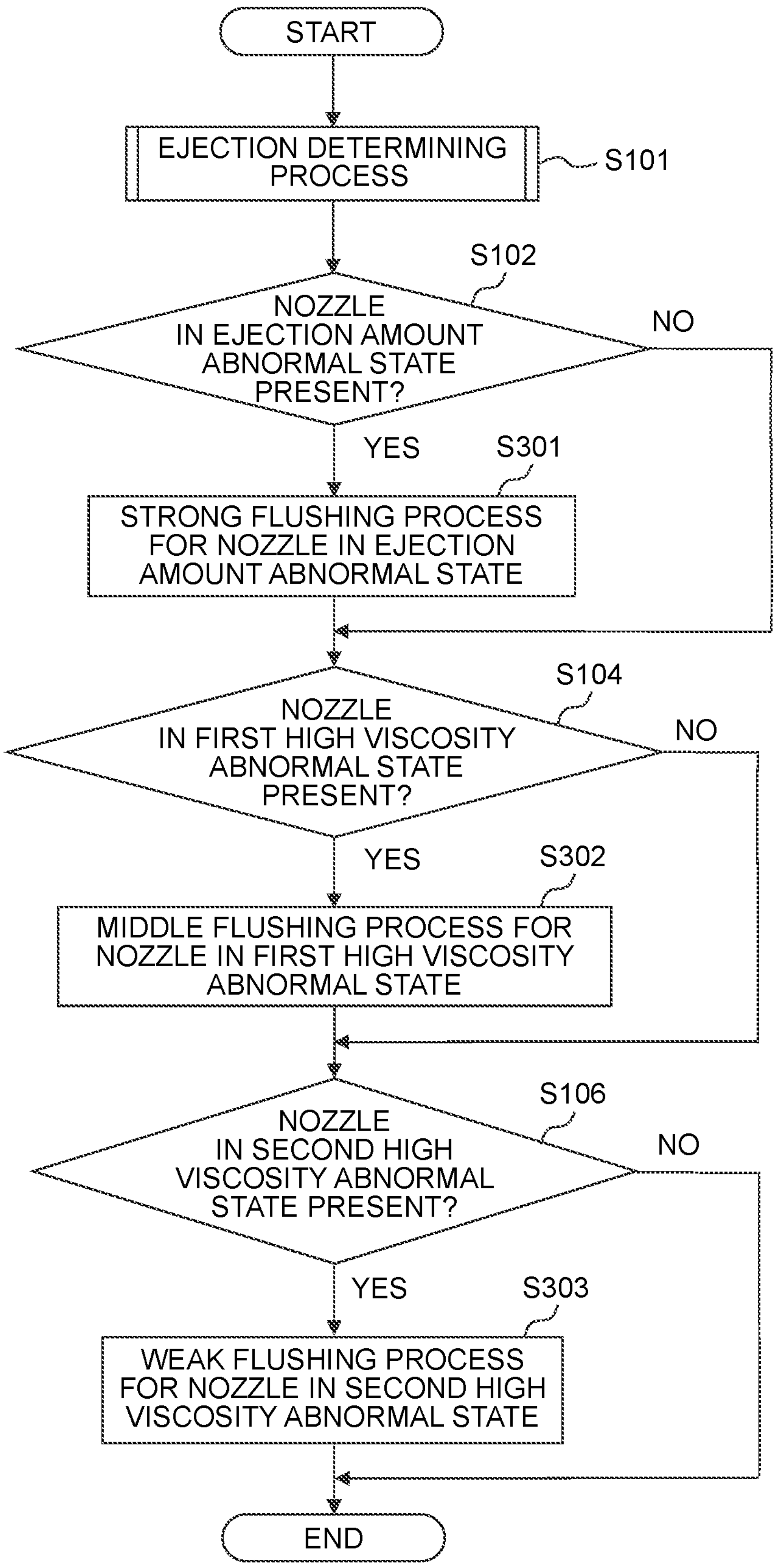

FIG. 7 is a flow chart depicting the flow of the determining of the ejection state and processes to be performed thereafter in an exemplary case in which the flushing is performed in a case that there is any nozzle in the ejection amount abnormal state.

Figure 8:
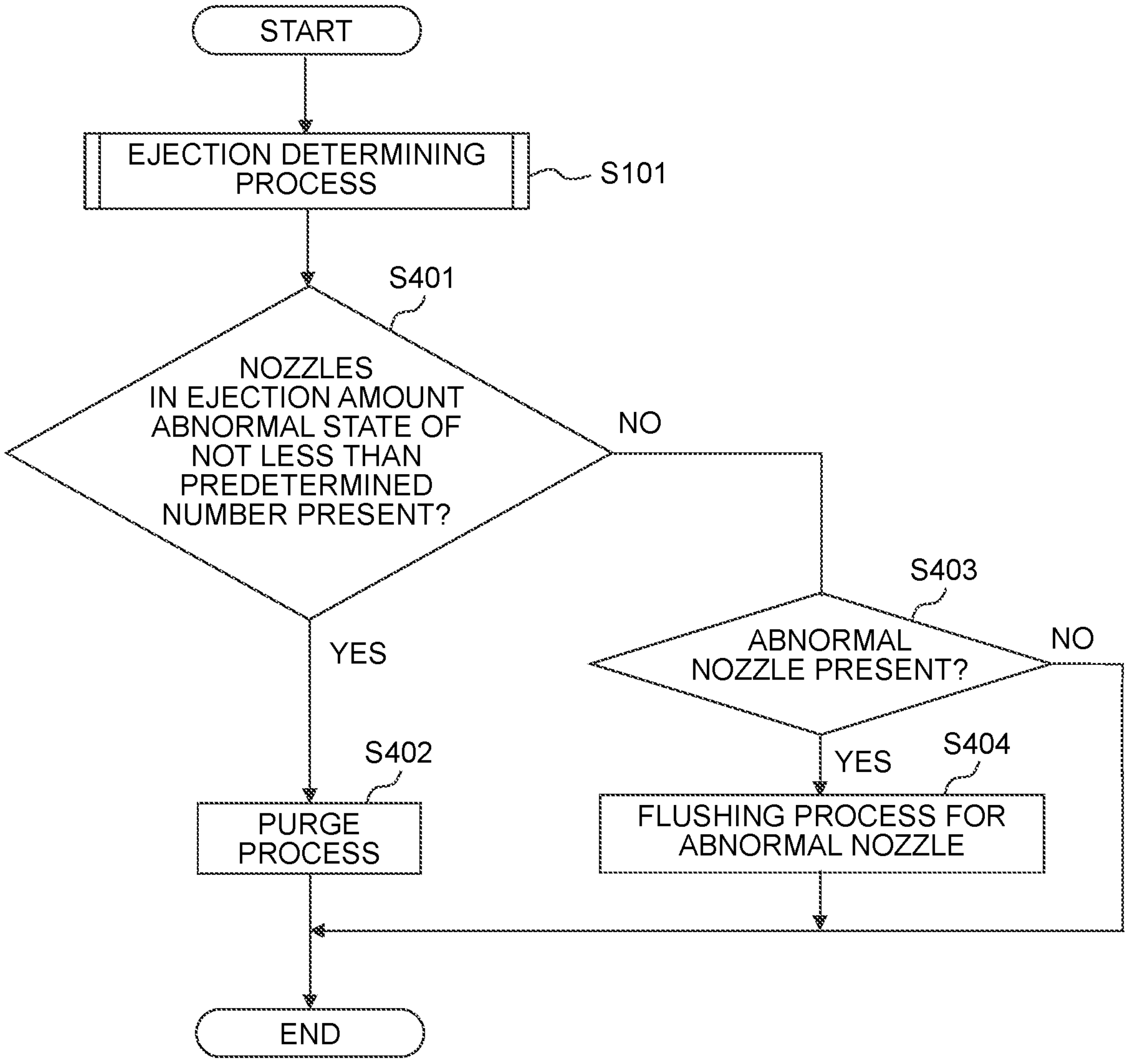

FIG. 8 is a flow chart depicting the flow of the determining of the ejection state and processes to be performed thereafter in an exemplary case in which the purge is performed in a case that not less than a predetermined number of nozzles in the ejection amount abnormal state are present.

Figure 9:
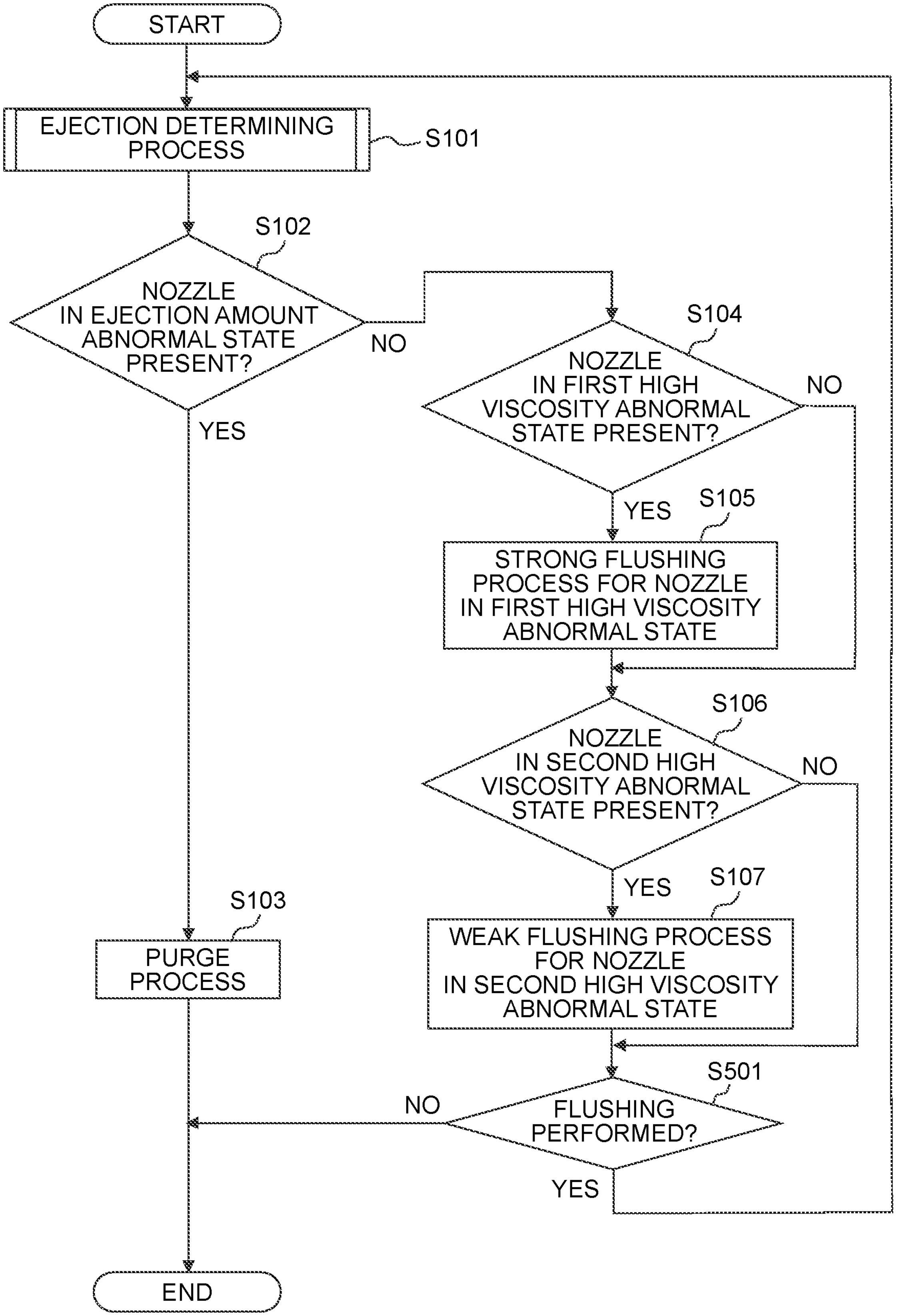

FIG. 9 is a flow chart depicting the flow of the determining of the ejection state and processes to be performed thereafter in an exemplary case in which the ejection determining process is executed again in a case that the flushing is performed.

Figure 10:
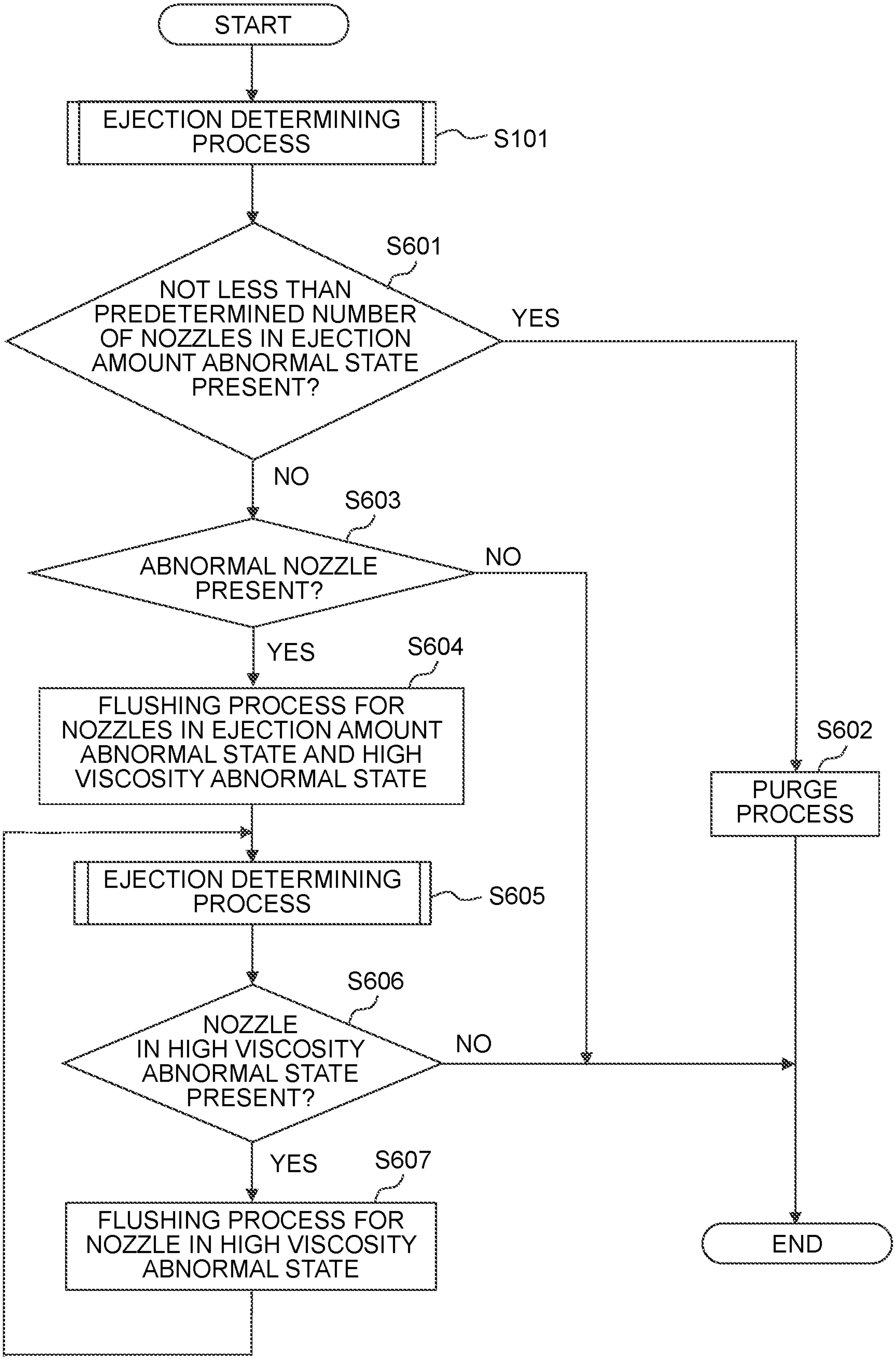

FIG. 10 is a flow chart depicting the flow of the determining of the ejection state and processes to be performed thereafter in an exemplary case in which the ink is discharged from the nozzle(s) in the ejection amount abnormal state and the nozzle(s) in the high viscosity abnormal state in the flushing based on the result of the first ejection determining process, and the ink is discharged from the nozzle(s) in the high viscosity abnormal state in the flushing based on the result of the ejection determining process performed again.

Figure 11:
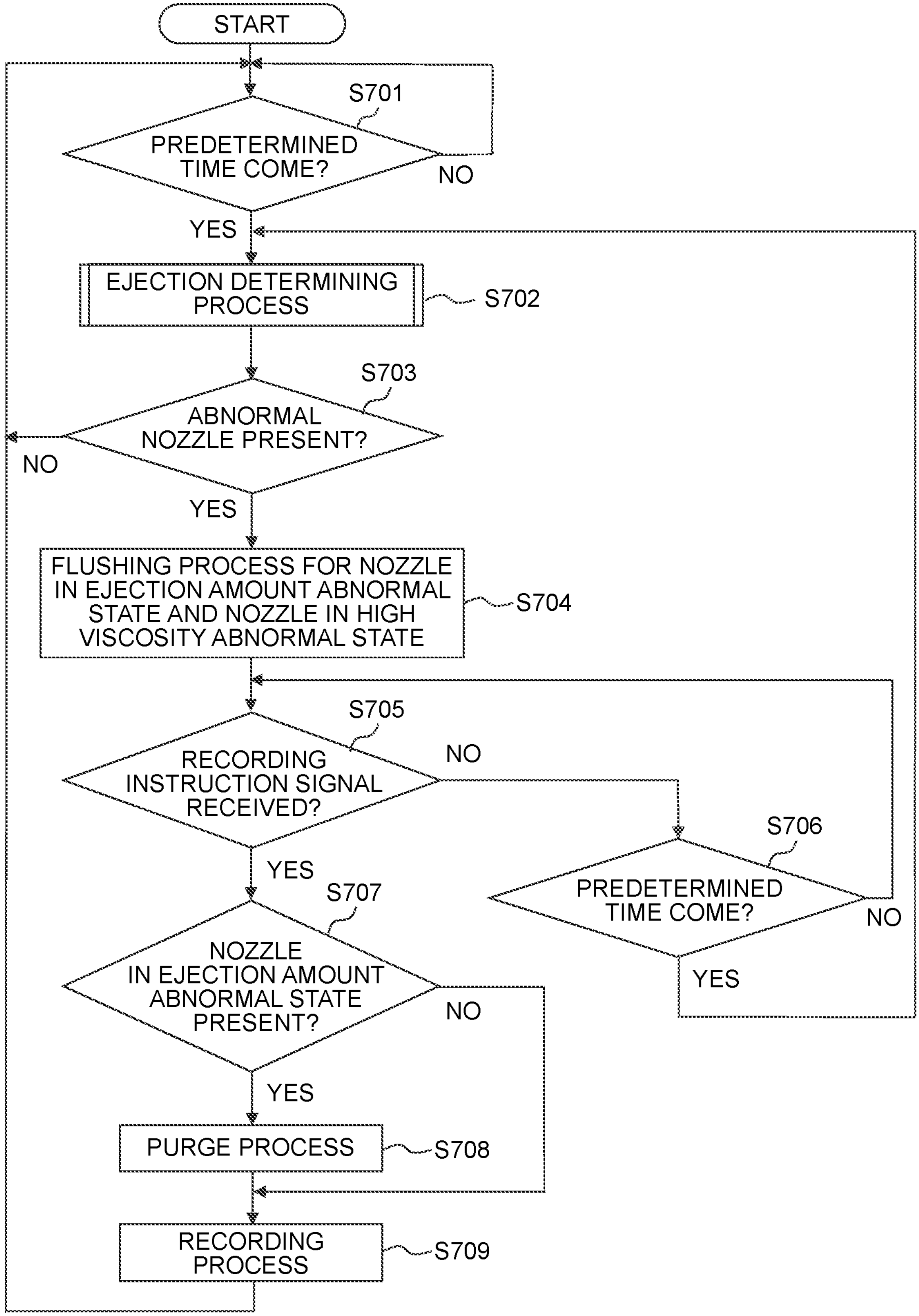

FIG. 11 is a flow chart depicting the flow of the determining of the ejection state and processes to be performed thereafter, in an exemplary case in which the ejection determining process is executed at a predetermined time.

Figure 12A:
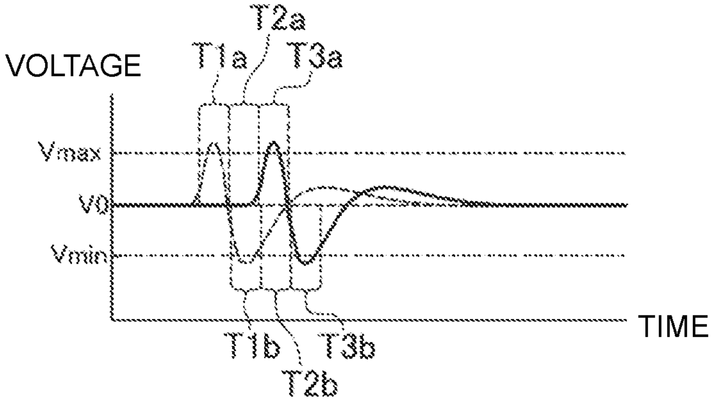
Figure 12B:
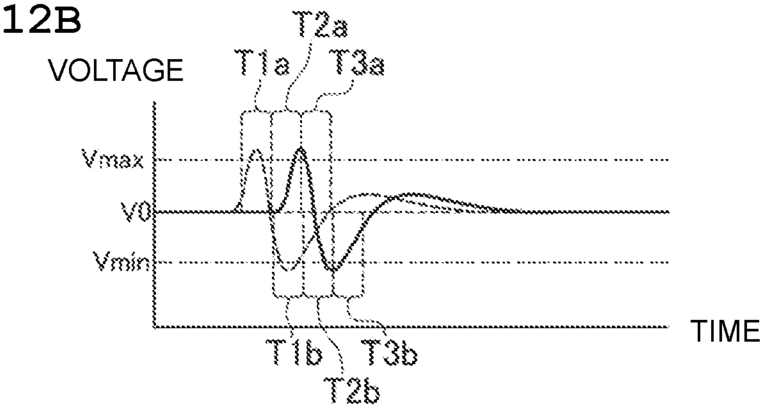
Figure 12C:
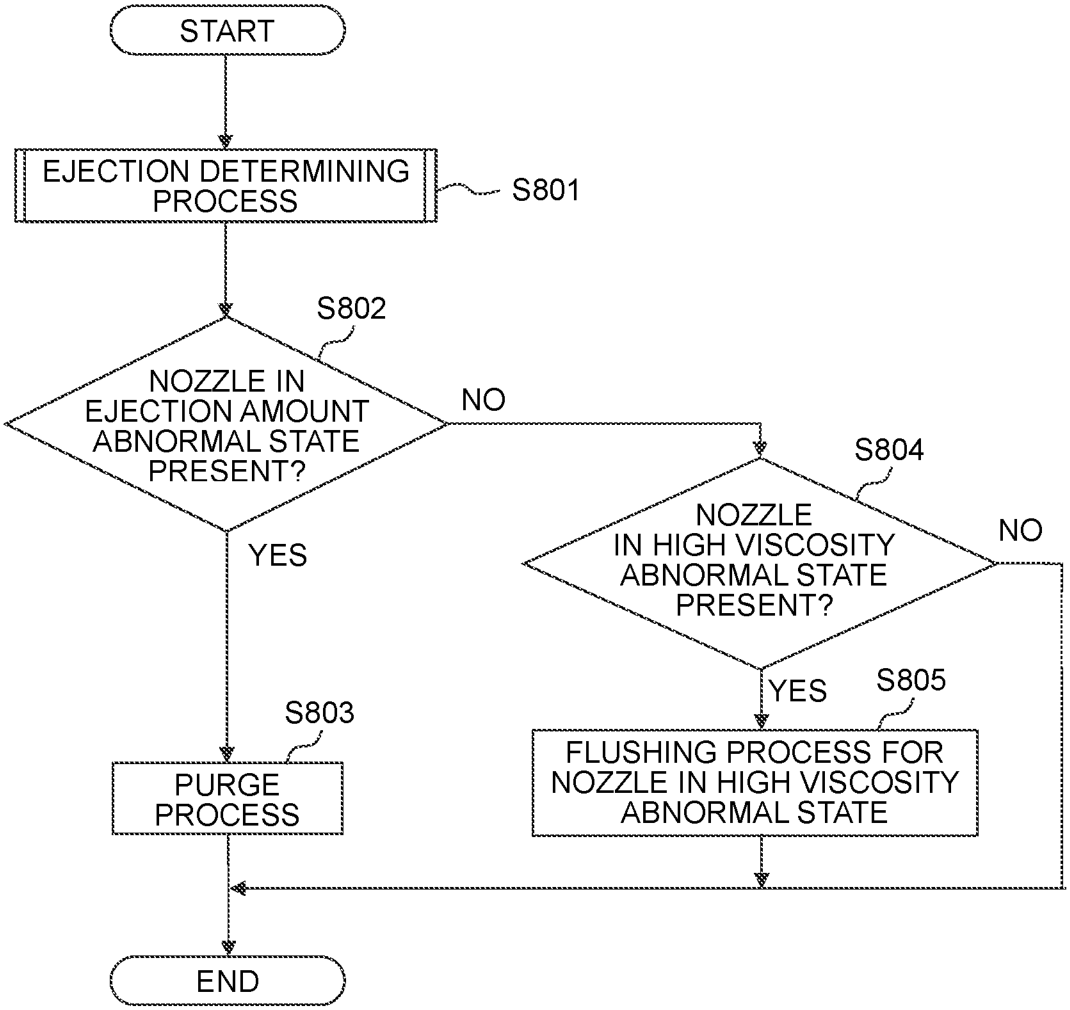

FIG. 12A is a drawing illustrative of the ejection state signal outputted when the ejection state is a third high viscosity abnormal state, FIG. 12B is a drawing illustrative of the ejection state signal outputted when the ejection state is a fourth high viscosity abnormal state, and FIG. 12C is a flow chart depicting the flow of the determining of the ejection state and processes to be performed thereafter, in an exemplary case in which it is determined whether the ejection state is the normal state or any one of the first to fourth high viscosity abnormal states.

Figure 13A:
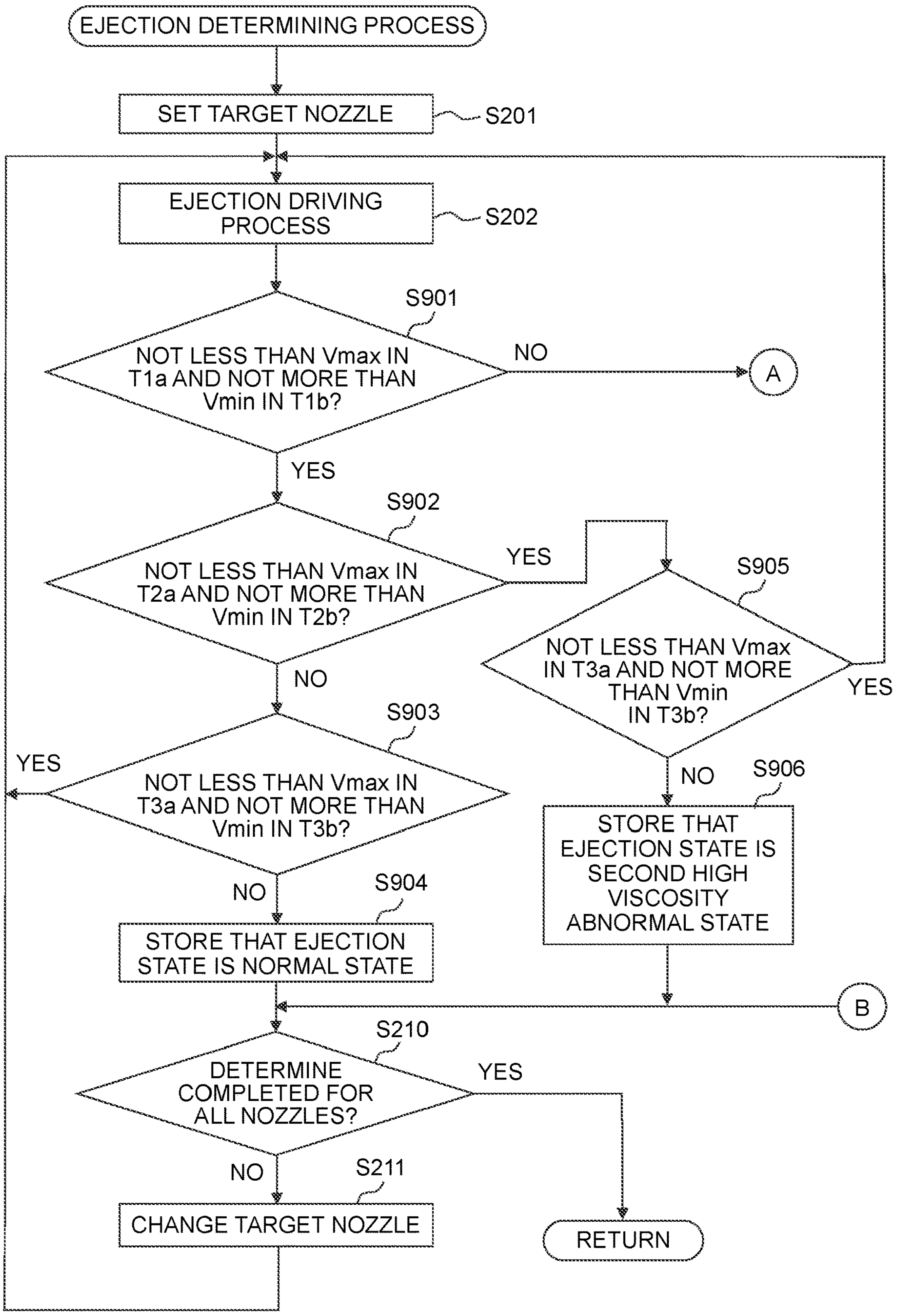
Figure 13B:
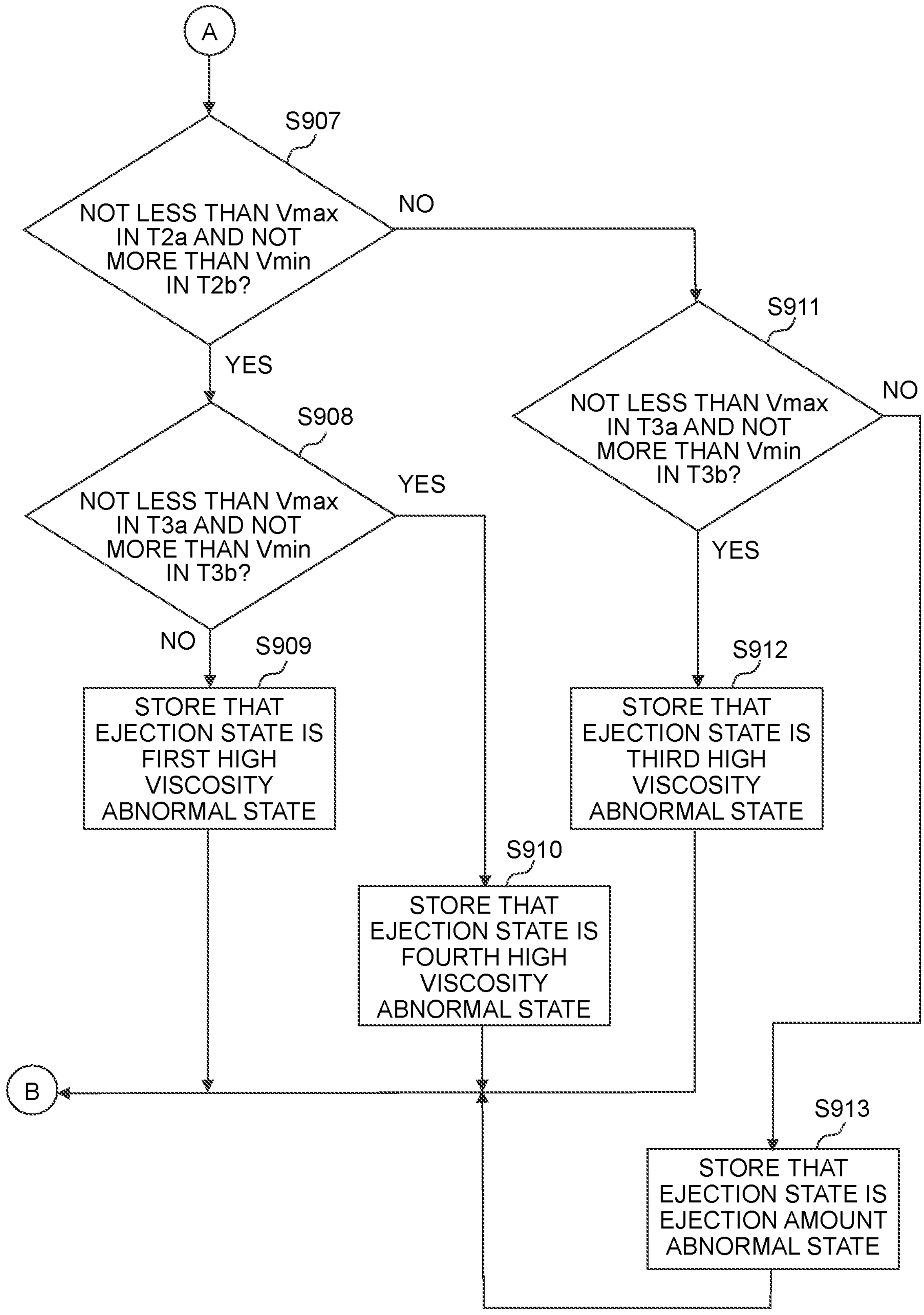

FIGS. 13A and 13B are each a part of a flow chart depicting the flow of the ejection determining process depicted in FIG. 12C.

Figure 14A:
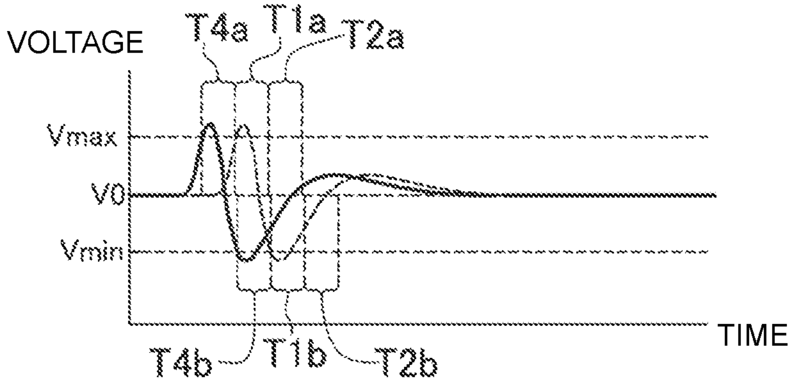
Figure 14B:
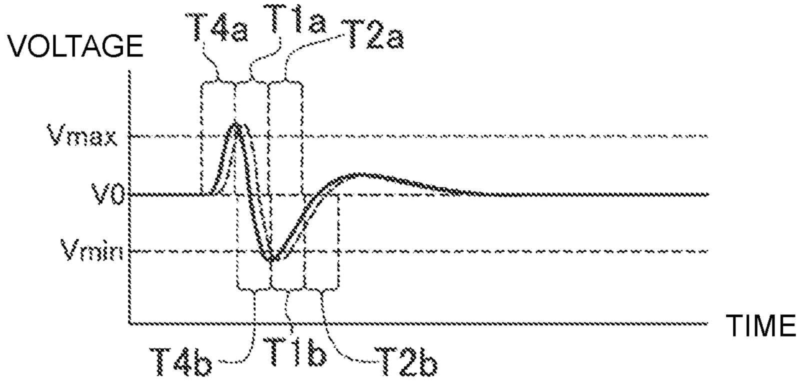
Figure 14C:
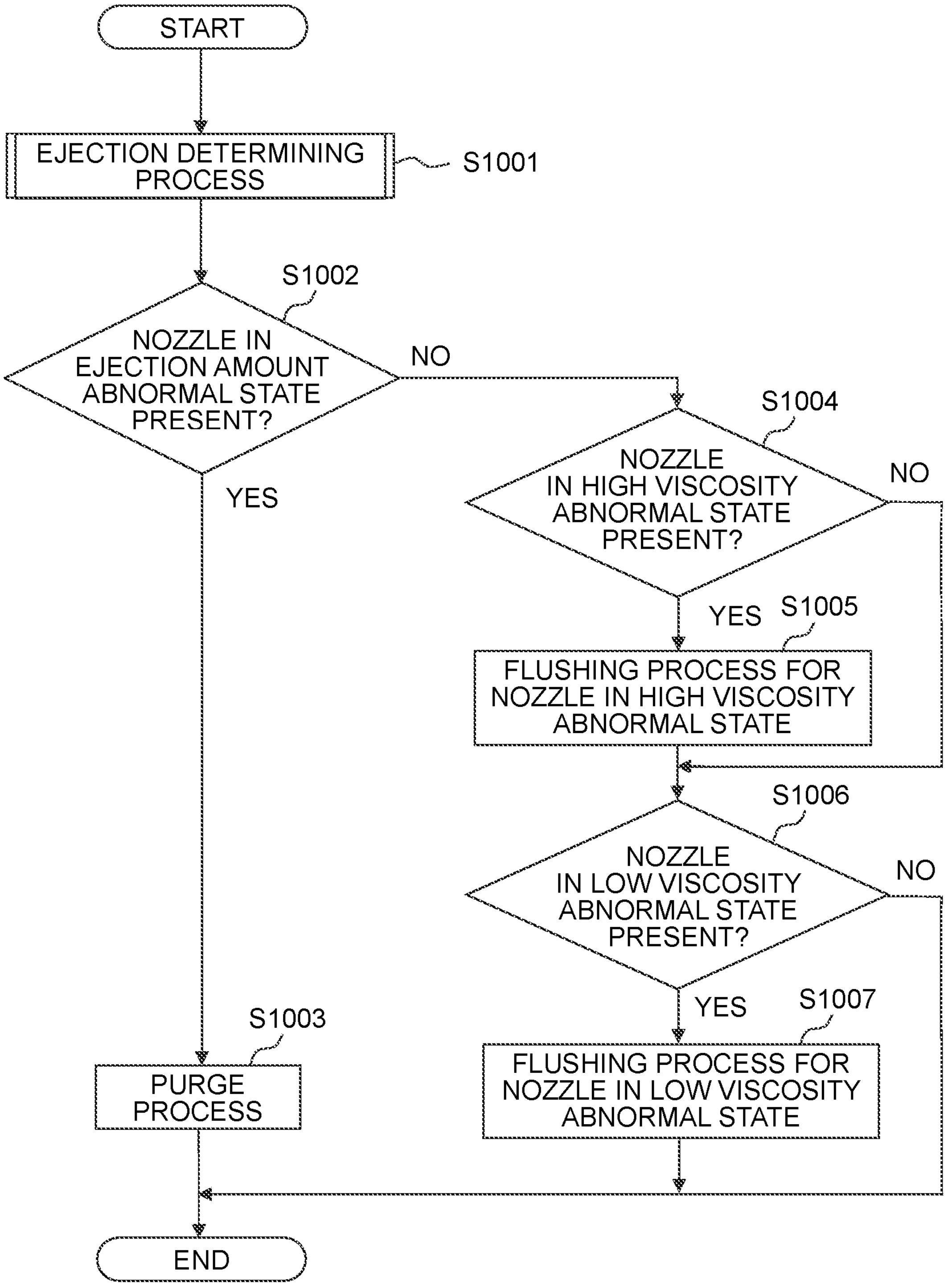

FIG. 14A is a drawing illustrative of the ejection state signal outputted when the ejection state is a first low viscosity abnormal state, FIG. 14B is a drawing illustrative of the ejection state signal outputted when the ejection state is a second low viscosity abnormal state, and FIG. 14C is a flow chart depicting the flow of the determining of the ejection state and processes to be performed thereafter, in an exemplary case in which it is determined whether the ejection state is the normal state, the first or second high viscosity abnormal state, the first or second low viscosity abnormal state, or the ejection amount abnormal state.

Figure 15A:
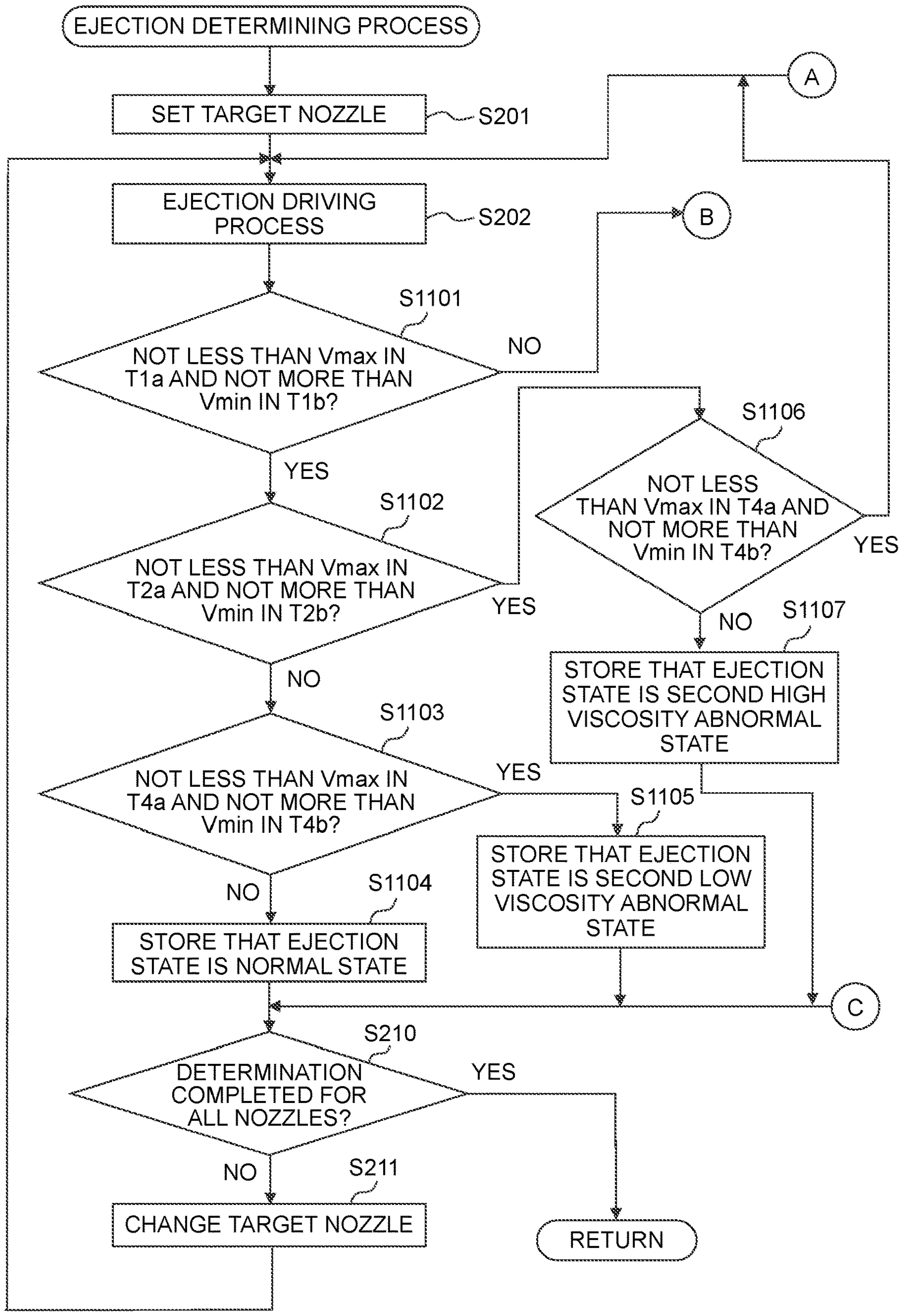
Figure 15B:
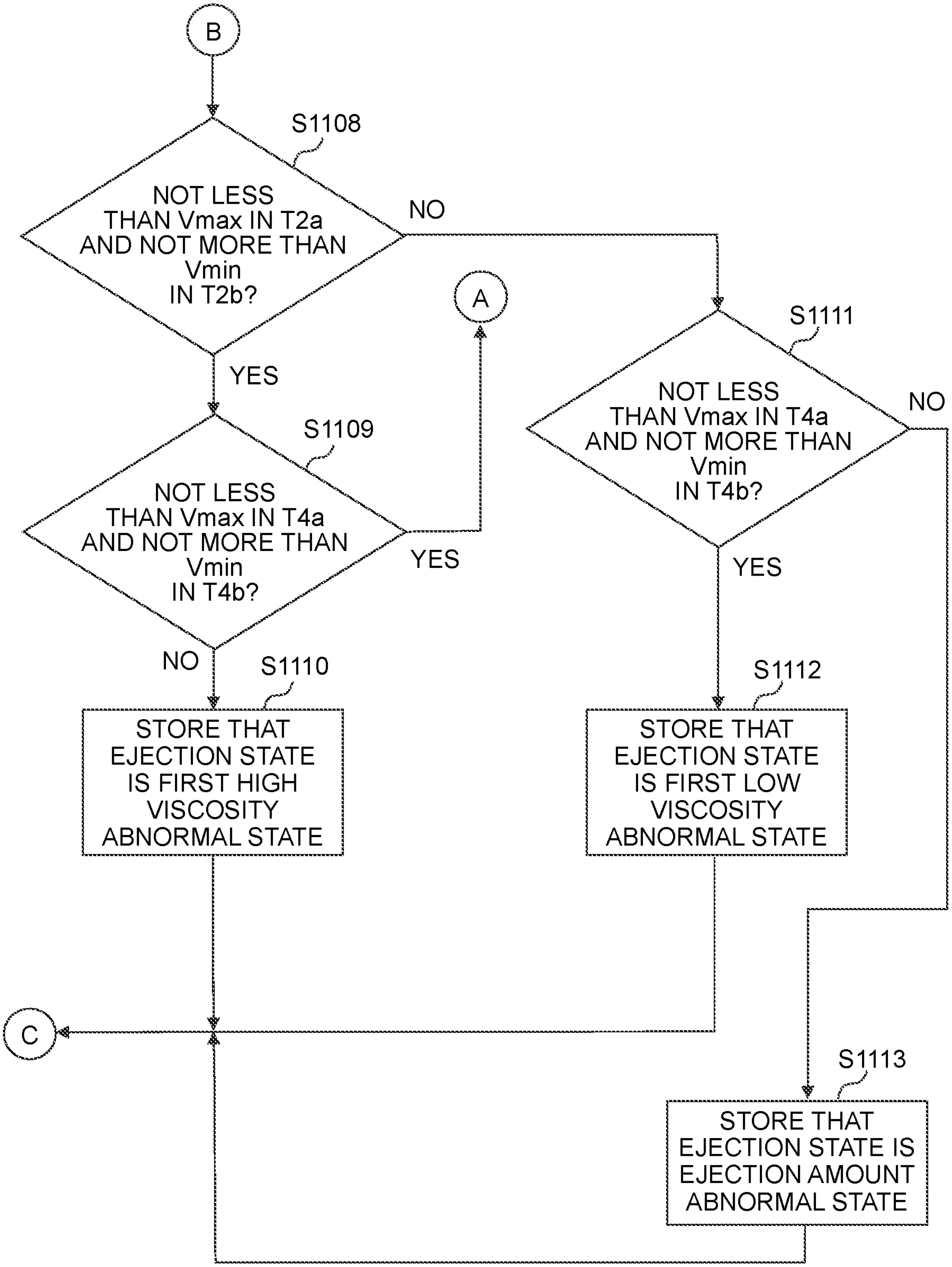

FIGS. 15A and 15B are each a part of a flow chart depicting the flow of the ejection determining process depicted in FIG. 14C.

Figure 16:
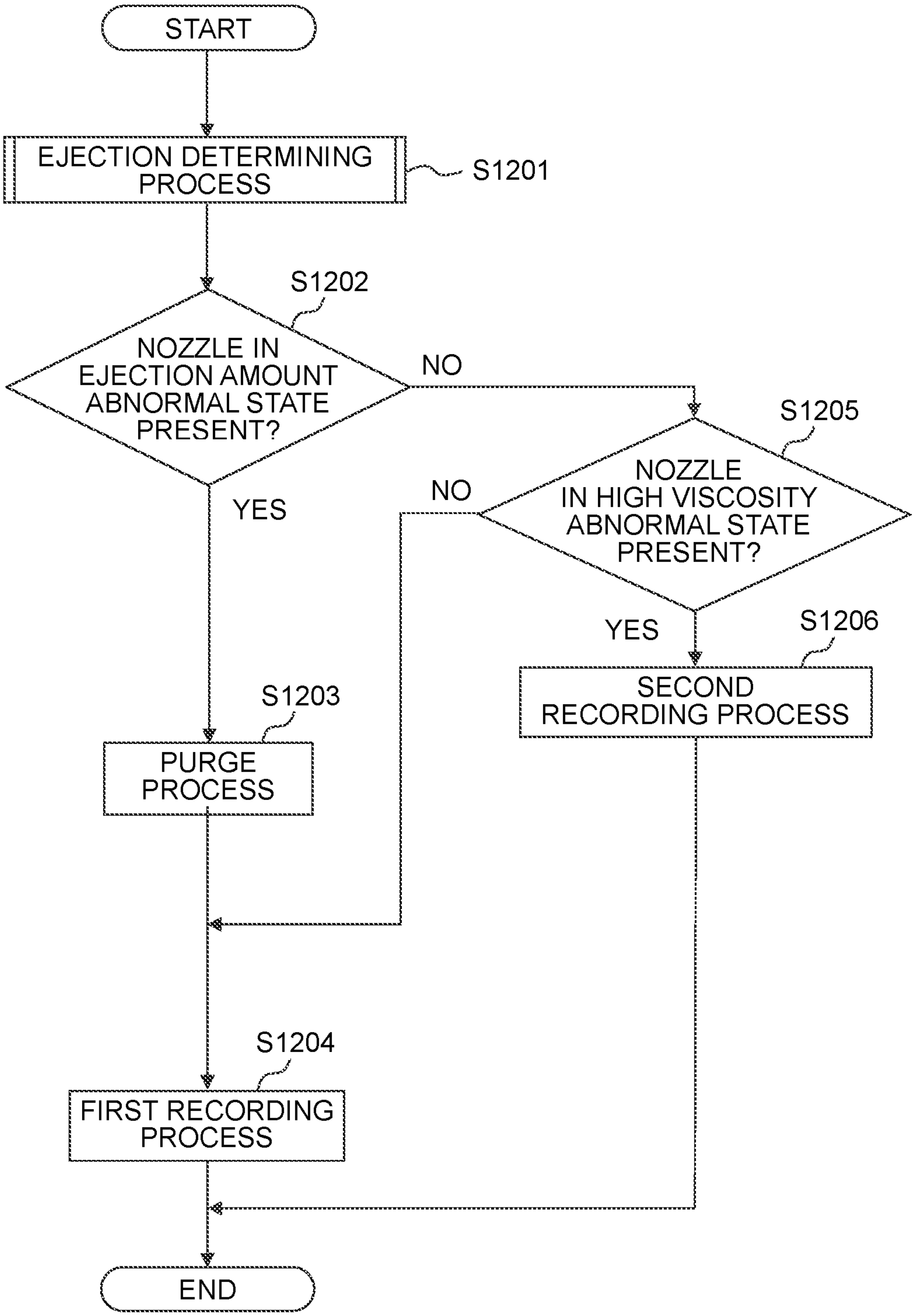

FIG. 16 is a flow chart depicting the flow of the determining of the ejection state and processes to be performed thereafter, in an exemplary case in which the operation is varied during the recording depending on whether or not the nozzle in the high viscosity abnormal state is present.

Figure 17A:
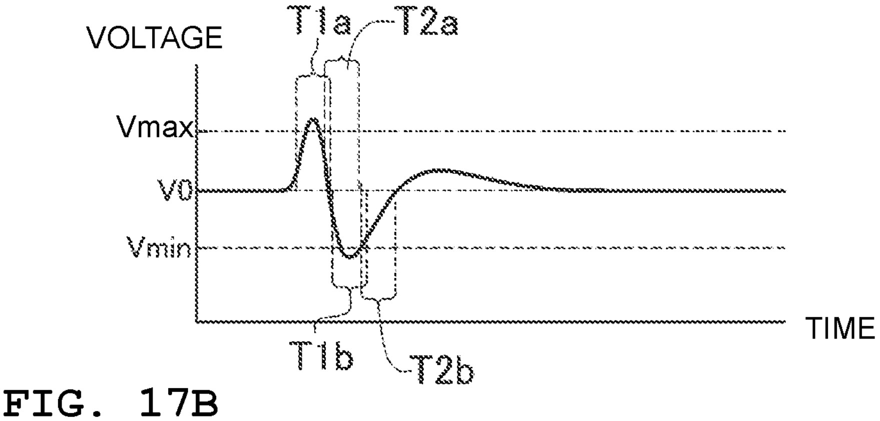
Figure 17B:
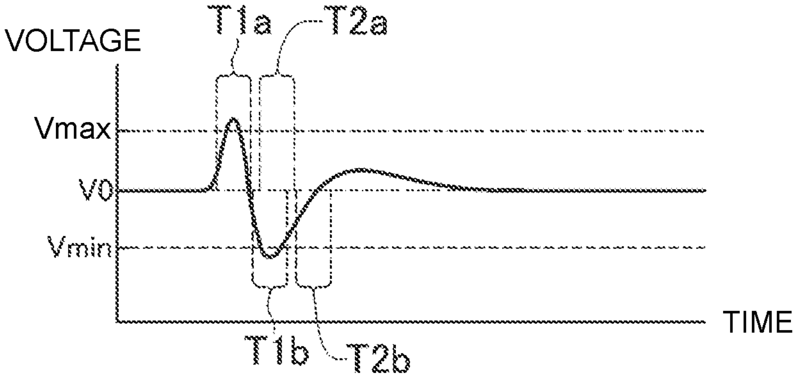

FIG. 17A is a drawing illustrative of an exemplary case in which a part of the first period and a part of the second period are overlapped with each other, and FIG. 17B is a drawing illustrative of an exemplary case in which an interval (a blank, or blank period) period is present between a part of the first period and a part of the second period.

An embodiment of the present disclosure will be explained below.

Overall Configuration of Printer

Figure 1:
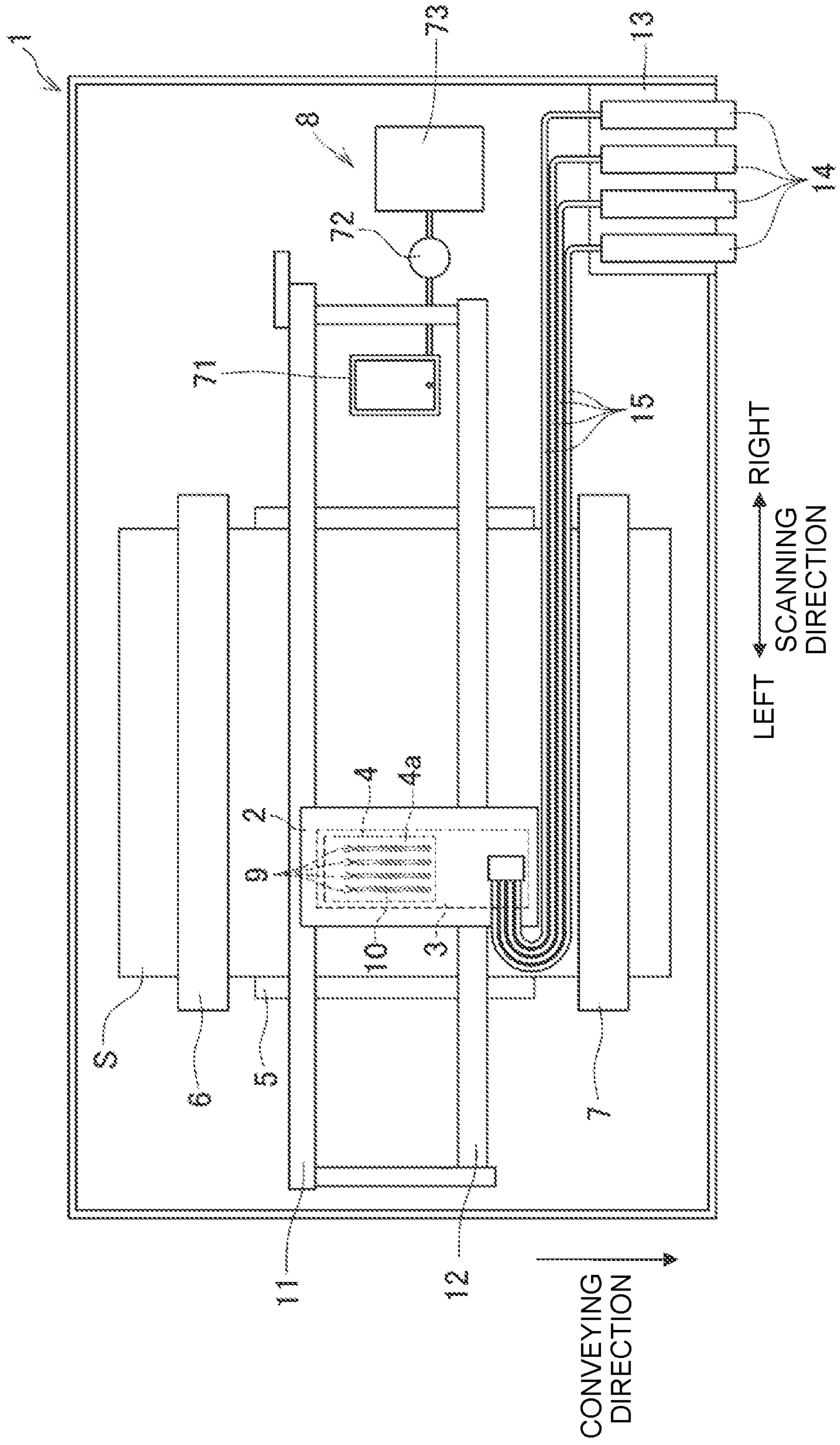
FIG. 1 is a schematic configuration diagram of a printer.

As depicted in FIG. 1, a printer 1 according to this embodiment is provided with, for example, a carriage 2, a subtank 3, an ink-jet head 4, a platen 5, conveying rollers 6, 7, and a maintenance unit 8. Note that in this embodiment, the printer 1 is an example of a "liquid ejection apparatus", and the ink-jet head 4 is an example of a "liquid ejection head".

The carriage 2 is supported by two guide rails 11, 12 which extend in the scanning direction. Note that in the following description, an explanation will be made while defining the right side and the left side in the scanning direction in a manner depicted in FIG. 1. The carriage 2 is connected to a carriage motor 86 (see FIG. 4) via, for example, an undepicted belt. When the carriage motor 86 is driven, the carriage 2 is moved in the scanning direction along the guide rails 11, 12.

The subtank 3 is mounted on the carriage 2. In this arrangement, the printer 1 is provided with a cartridge holder 13. Four ink cartridges 14 are removably installed to the cartridge holder 13. The four ink cartridges 14, which are installed to the cartridge holder 13, are arranged in the scanning direction. The four ink cartridges 14 store inks of black, yellow, cyan, and magenta in an order starting from those positioned on the right side in the scanning direction. Note that in this embodiment, the ink is an example of a "liquid".

The ink-jet head 4 is mounted on the carriage 2, and the ink-jet head 4 is connected to the lower end portion of the subtank 3. Further, the ink-jet head 4 ejects the inks from a plurality of nozzles 10 which are formed on a nozzle surface 4*a* as the lower surface of the ink-jet head 4. This feature will be explained in more detail below. The plurality of nozzles 10 forms a nozzle array 9 by being arranged in the conveying direction which is orthogonal to the scanning direction. The four nozzle arrays 9 are arranged in the scanning direction on the nozzle surface 4*a*. Positions of the nozzles 10 in the conveying direction are identical among the four nozzle arrays 9. The inks of black, yellow, cyan, and magenta are supplied from the subtank 3 to the plurality of nozzles 10 in an order starting from those which form the nozzle array 9 disposed on the right side. Accordingly, the inks of black, yellow, cyan, and magenta are ejected respectively from the nozzles, of the plurality of nozzles 10, constituting the first, second, third, and fourth nozzle arrays 9 from the right side in the scanning direction.

The platen 5 is arranged under or below the ink-jet head 4, and the platen 5 is opposed to the plurality of nozzles 10. The platen 5 extends over the entire length of the recording paper S in the scanning direction, and the platen 5 supports the recording paper S from the lower position. The conveying roller 6 is arranged on the upstream side in the conveying direction of the ink-jet head 4 and the platen 5. The conveying roller 7 is arranged on the downstream side in the conveying direction of the ink-jet head 4 and the platen 5. The conveying rollers 6, 7 are connected to the conveyance motor 87 (see FIG. 4) via, for example, undepicted gears. When the conveyance motor 87 is driven, then the conveying rollers 6, 7 are rotated, and the recording paper S is conveyed in the conveying direction.

Then, the printer 1 is operated as follows by means of a controller 80 (see FIG. 4) described later on. That is, the recording pass and the conveyance operation are repeatedly performed. In the recording pass, the carriage motor 86 is controlled to move the carriage 2 in the scanning direction, while the ink-jet head 4 is caused to eject (discharge) the inks from the plurality of nozzles 10. In the conveyance operation, the conveyance motor 87 is controlled so that the conveying rollers 6, 7 are caused to convey the recording paper S. Thus, the recording can be performed on the recording paper S.

The maintenance unit 8 includes a cap 71, a suction pump 72, and a waste liquid tank 73. The cap 71 is arranged on the right side in the scanning direction of the platen 5. When the carriage 2 is positioned at the maintenance position disposed on the right side in the scanning direction of the platen 5, the plurality of nozzles 10 are opposed to the cap 71.

Further, the cap 71 is connected to a cap ascending-descending mechanism 88 (see FIG. 4). When the cap ascending-descending mechanism 88 is driven, the cap 71 is moved upwardly and downwardly. When the cap 71 is moved upwardly by means of the cap ascending-descending mechanism 88 in a state that the plurality of nozzles 10 are opposed to the cap 71 by positioning the carriage 2 at the maintenance position described above, the upper end portion of the cap 71 makes tight contact with the nozzle surface 4*a*. Accordingly, the capped state is given, in which the plurality of nozzles 10 of the ink-jet head 4 are covered with the cap 71. In a state that the cap 71 is moved downwardly, the plurality of nozzles 10 are not covered with the cap 71. Note that the cap 71 is not limited to those which cover the plurality of nozzles 10 by making tight contact with the nozzle surface 4*a*. The cap 71 may cover the plurality of nozzles 10, for example, by making tight contact with, for example, an undepicted frame arranged around the nozzle surface 4*a* of the ink-jet head 4.

The suction pump 72 is, for example, a tube pump. The suction pump 72 is connected to the cap 71 and the waste liquid tank 73. Then, as for the maintenance unit 8, when the suction pump 72 is driven after providing the capped state as described above, it is possible to perform the suction purge in which the inks contained in the ink-jet head 4 are discharged from the plurality of nozzles 10. The inks, which are discharged by the suction purge, are stored in the waste liquid tank 73.

Note that in this section, for the sake of convenience, the explanation has been made assuming that the cap 71 covers all of the nozzles 10 all at once, and the inks contained in the ink-jet head 4 are discharged from all of the nozzles 10. However, there is no limitation thereto. For example, the cap 71 may be separately provided with a portion which covers the plurality of nozzles 10 for constructing the nozzle array 9 disposed on the rightmost side for ejecting the black ink, and a portion which covers the plurality of nozzles 10 for constructing the three nozzle arrays 9 disposed on the left side for ejecting the color inks. By using such cap 71, any one of the black ink and the color inks contained in the ink-jet head 4 can be selectively discharged in the suction purge. Alternatively, for example, the caps 71 may be provided individually for each of the nozzle arrays 9. In such configuration, the ink can be discharged from the nozzles 10 individually for each of the nozzle arrays 9 in the suction purge.

Figure 2:
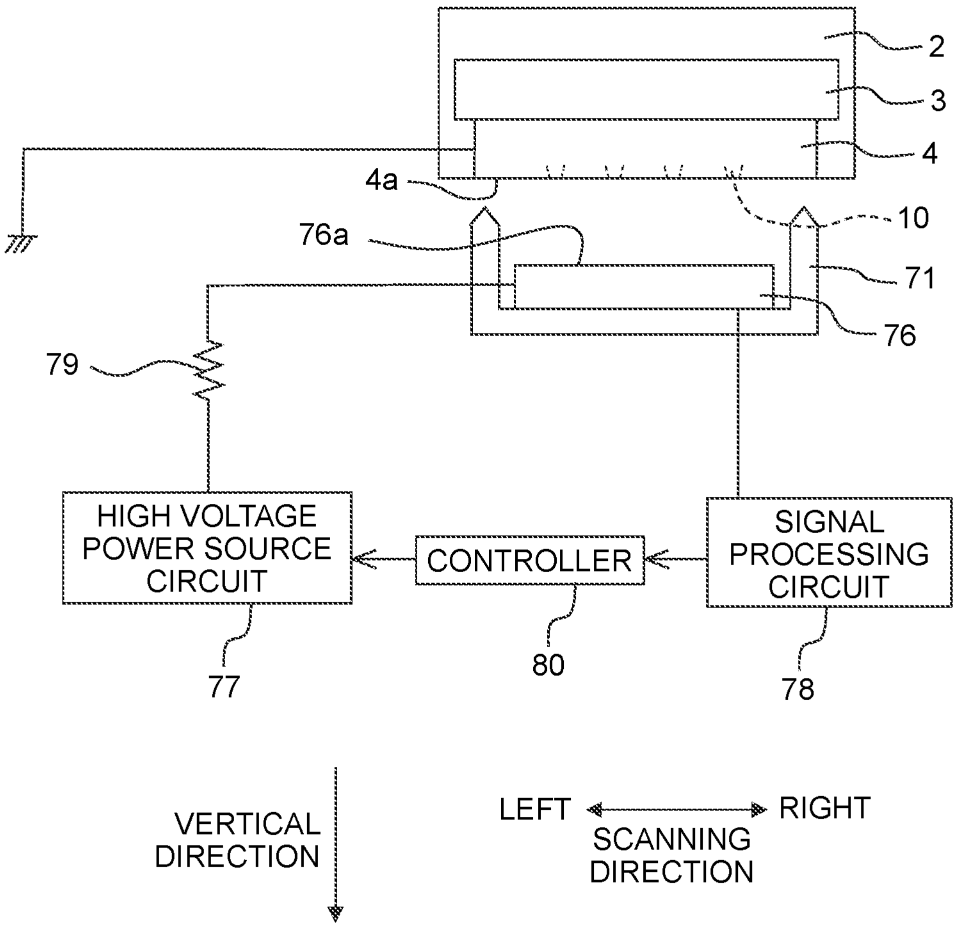
FIG. 2 is a drawing illustrative of an electrode arranged in a cap and a relationship of connection between the electrode and a high voltage power source circuit and a signal processing circuit.

Further, as depicted in FIG. 2, an electrode 76, which has a rectangular planar shape, is arranged in the cap 71. The electrode 76 is opposed to the plurality of nozzles 10 of the ink-jet head 4 in a state that the carriage 2 is positioned at the maintenance position. The electrode 76 is connected to a high voltage power source circuit 77 via a resistor 79. Then, the high voltage power source circuit 77 applies a predetermined voltage of, for example, about 600 V to the electrode 76. On the other hand, the ink-jet head 4 is retained at the ground electric potential. Accordingly, a predetermined electric potential difference is generated between the ink-jet head 4 and the electrode 76. A signal processing circuit 78 is connected to the electrode 76. The signal processing circuit 78 includes, for example, a differentiating circuit. The signal processing circuit 78 outputs a signal corresponding to the change of the voltage in the electrode 76. Note that in this embodiment, the combination of the electrode 76, the high voltage power source circuit 77, the signal processing circuit 78, and the resistor 79 is an example of a "signal outputter (signal output part)".

In this embodiment, when the ink-jet head 4 is caused to perform the ejection driving for ejecting the inks from the nozzle 10 toward the electrode 76 in a state that the predetermined voltage is applied to the electrode 76 by the high voltage power source circuit 77 while providing the capped state as described above, the ejection state signal corresponding to the ink ejection state of the nozzle 10, is outputted from the signal processing circuit 78.

This feature will be explained in more detail below. If the ejection state of the ink ejected from the nozzle 10 is the normal state, then the voltage value of the ejection state signal is raised from V0, and the voltage value becomes (reaches) the maximum value which is not less than the threshold value Vmax in the period T1*a* as depicted in FIG. 3A. After that, the voltage value of the ejection state signal is lowered, and the voltage value becomes (reaches) the minimum value which is not more than the threshold value Vmin in the period T1*b*. After that, the voltage value of the ejection state signal repeats the increase and the decrease while attenuating, and the voltage value converges to V0. Note that in this embodiment, the ejection state signal depicted in FIG. 3A is an example of a "first ejection state signal". Further, the combination of the periods T1*a*, T1*b* is an example of a "first period".

In a case that the ejection state of the ink ejected from the nozzle 10 is the first high viscosity abnormal state in which the viscosity of the ink contained in the nozzle 10 is high as compared with the normal state, the time, which is required until the ink is ejected from the nozzle 10 after the start of the ejection driving, is longer than that required in the normal state. On this account, as depicted by a solid line in FIG. 3B, the voltage value of the ejection state signal is raised from V0, and the voltage value becomes the maximum value which is not less than the threshold value Vmax in the period T2*a* that comes after the period T1*a*. After that, the value of the ejection state signal is lowered, and the value becomes the minimum value which is not more than the threshold value Vmin in the period T2*b* after the period T1*b*. After that, the voltage value of the ejection state signal repeats the increase and the decrease while attenuating, and the voltage value converges to V0. Note that in this embodiment, the ejection state signal depicted by the solid line in FIG. 3B is an example of a "second ejection state signal". The combination of the periods T2*a*, T2*b* is an example of a "second period". Further, in this embodiment, the timing at which the period T1*a* ends is the same timing as the timing at which the period T2*a* starts. Further, the timing at which the period T1*b* ends is the same timing as the timing at which the period T2*b* starts. Note that in FIG. 3B, the first ejection state signal is depicted by a broken line.

In a case that the ejection state of the ink ejected from the nozzle 10 is the second high viscosity abnormal state in which the viscosity of the ink contained in the nozzle 10 is high as compared with the normal state and low as compared with the first high viscosity abnormal state, the time, which is required until the ink is ejected from the nozzle 10 after the start of the ejection driving, is longer than that required in the normal state and shorter than that required in the first high viscosity abnormal state. On this account, as depicted by a solid line in FIG. 3C, the voltage value of the ejection state signal is raised from V0, and each of the maximum values provided in the period T1*a* and the period T2*a* becomes not less than the threshold value Vmax. After that, the voltage value of the ejection state signal is lowered, and each of the minimum values provided in the period T1*b* and the period T2*b* becomes not more than the threshold value Vmin. After that, the voltage value of the ejection state signal repeats the increase and the decrease while attenuating, and the voltage value converges to V0. Note that in this embodiment, the ejection state signal depicted by a solid line in FIG. 3C is an example of a "fourth ejection state signal". Further, in FIG. 3C, the first ejection state signal is depicted by a broken line.

In a case that the ejection state of the ink ejected from the nozzle 10 is the ejection amount abnormal state in which the amount of ejection of the ink is small, the voltage value of the ejection state signal undergoes the small fluctuation from V0. On this account, the value of the ejection state signal does not become the value which is not less than the threshold value Vmax in any one of the period T1*a* and the period T2*a*. In this case, the ejection amount abnormal state includes the non-ejection in which the ink is not ejected at all. Further, the value of the ejection state signal does not become the value which is not more than the threshold value Vmin in any one of the period T1*b* and the period T2*b*. Note that in this embodiment, the ejection state signal, which is depicted by a solid line in FIG. 3D, is an example of a "third ejection state signal". Further, in FIG. 3D, the first ejection state signal is depicted by a broken line.

Note that in this embodiment, the combination of the condition that the voltage value of the ejection state signal becomes not less than the threshold value Vmax and the condition that the voltage value of the ejection state signal becomes not more than the threshold value Vmin are an example of each of a "first condition" and a "second condition". That is, in this embodiment, the first condition is the same condition as the second condition.

In this embodiment, the ejection state signal, which is outputted from the signal processing circuit 78, is the voltage signal. However, the ejection state signal, which is outputted from the signal processing circuit 78, may be a current signal. Further, this embodiment has been configured such that the predetermined voltage is applied to the electrode 76, the ink-jet head 4 is retained at the ground electric potential, and the signal processing circuit 78 outputs the signal depending on the voltage of the electrode 76. However, there is no limitation thereto. The following configuration is also adoptable. That is, the electrode 76 is retained at the ground electric potential. The electric potential difference is generated between the electrode 76 and the ink-jet head 4 by applying a predetermined voltage to the ink-jet head 4. And, the signal processing circuit 78 is connected to the ink-jet head 4 to output the signal corresponding to the change of the voltage of the ink-jet head 4.

Electrical Configuration of Printer

Next, the electrical configuration of the printer 1 will be explained. As depicted in FIG. 4, the printer 1 is provided with a controller 80. The controller 80 is composed of, for example, CPU 81, ROM 82, RAM 83, flash memory 84, and ASIC 85. The controller 80 controls the operation (action) of, for example, the carriage motor 86, the ink-jet head 4, the conveyance motor 87, the cap ascending-descending mechanism 88, the suction pump 72, and the high voltage power source circuit 77. Here, CPU is the abbreviation of "Central Processing Unit". Further, ROM is the abbreviation of "Read Only Memory". Further, RAM is the abbreviation of "Random Access Memory". Further, ASIC is the abbreviation of "Application Specific Integrated Circuit".

Note that as for the controller 80, only CPU 81 may perform various processes, only ASIC 85 may perform various processes, or CPU 81 and ASIC 85 may perform various processes in a cooperating manner. Further, as for the controller 80, one CPU 81 may perform the process alone, or a plurality of CPU's 81 may perform the process in a shared manner. Further, as for the controller 80, one ASIC 85 may perform the process alone, or a plurality of ASIC's 85 may perform the process in a shared manner.

Determining of Ejection State and Process Depending on Ejection State

Next, an explanation will be made about the process for the printer 1 in which the ink ejection state is determined for each of the plurality of nozzles 10 of the ink-jet head 4 to perform the process depending on the ejection state. This process is performed at an appropriate timing. For example, this process may be performed when a predetermined time comes. Alternatively, this process may be performed before starting the process for the recording after receiving the recording instruction signal for giving instruction to perform the recording on the recording paper S. Alternatively, this process may be performed when the recording is performed on a predetermined number of recording paper sheets S after the execution of this process last time. Alternatively, this process may be performed when an error disappears after the occurrence of the predetermined error in the printer 1.

In the printer 1, the controller 80 performs the process in accordance with a flow chart depicted in FIG. 5. Thus, the controller 80 determines the ejection state for each of the plurality of nozzles 10 of the ink-jet head 4, and performs the process depending on the ejection state.

The flow chart depicted in FIG. 5 will be explained in detail below. At first, the controller 80 executes the ejection determining process (S101). In the ejection determining process, the controller 80 performs the process in accordance with a flow chart depicted in FIGS. 6A and 6B.

The flow chart depicted in FIGS. 6A and 6B will be explained in detail below. At first, the controller 80 sets one of the plurality of nozzles 10 of the ink-jet head 4 to be the target nozzle (S201). Subsequently, the controller 80 executes the ejection driving process (S202). In the ejection driving process, the controller 80 controls, for example, the carriage motor 86 and the cap ascending-descending mechanism 88 to provide the capped state as described above. Further, the controller 80 causes the ink-jet head 4 to perform the ejection driving for ejecting the ink from the target nozzle in a state that the predetermined voltage is applied to the electrode 76 by controlling the high voltage power source circuit 77.

Subsequently, in a case that the ejection state signal outputted from the signal processing circuit 78 when the ejection driving is performed in S202 fulfills the condition that the voltage value of the ejection state signal becomes not less than the threshold value Vmax in the period T1*a* and not more than the threshold value Vmin in the period T1*b* (S203: YES); and does not fulfill the condition that the voltage value of the ejection state signal becomes not less than the threshold value Vmax in the period T2*a* and not more than the threshold value Vmin in the period T2*b* (S204: NO), then the controller 80 causes the flash memory 84 to store information (data) indicating that the ejection state of the target nozzle is the normal state (S205).

Further, in a case that the ejection state signal outputted from the signal processing circuit 78 when the ejection driving is performed in S202 fulfills the condition that the voltage value of the ejection state signal becomes not less than the threshold value Vmax in the period T1*a* and not more than the threshold value Vmin in the period T1*b* (S203: YES); and fulfills the condition that the voltage value of the ejection state signal becomes not less than the threshold value Vmax in the period T2*a* and not more than the threshold value Vmin in the period T2*b* (S204: YES), then the controller 80 causes the flash memory 84 to store information indicating that the ejection state of the target nozzle is the second high viscosity abnormal state (S206).

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S203: NO) and fulfills the condition that the voltage value of the ejection state signal becomes not less than the threshold value Vmax in the period T2*a* and not more than the threshold value Vmin in the period T2*b* (S207: YES), then the controller 80 causes the flash memory 84 to store information indicating that the ejection state of the target nozzle is the first high viscosity abnormal state (S208).

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S203: NO) and does not fulfill the condition that the voltage value of the ejection state signal becomes not less than the threshold value Vmax in the period T2*a* and not more than the threshold value Vmin in the period T2*b* (S207: NO), then the controller 80 causes the flash memory 84 to store information indicating that the ejection state of the target nozzle is the ejection amount abnormal state (S209).

After the processes of S205, S206, S208, and S209, if any nozzle 10, for which the determination of the ejection state is not completed, is present in the plurality of nozzles 10 of the ink-jet head 4 (S210: NO), then the controller 80 changes the target nozzle to any nozzle 10 for which the determination of the ejection state is not completed (S211), and the process returns to S202. Then, in a case that the determination of the ejection state is completed for all of the nozzles 10 of the ink-jet head 4 (S210: YES), the process returns to the flow chart depicted in FIG. 5.

With reference to FIG. 5 again, the controller 80 subsequently determines whether or not any nozzle 10 in the ejection amount abnormal state is present in the plurality of nozzles 10 of the ink-jet head 4, on the basis of the information about the ejection state stored in the flash memory 84 in the ejection determining process of S101 (S102). In a case that the nozzle 10 in the ejection amount abnormal state is present (S102: YES), then the controller 80 executes the purge process (S103), and the controller 80 terminates the process. In the purge process, the controller 80 controls, for example, the suction pump 72 and the cap ascending-descending mechanism 88 to perform the suction purge as described above. Note that in this embodiment, the suction purge is an example of a "first discharging operation", and the maintenance unit 8 to perform the suction purge is an example of a "first discharger".

In a case that the nozzle 10 in the ejection amount abnormal state is absent (S102: NO), the controller 80 determines whether or not the nozzle 10 in the first high viscosity abnormal state is present in the plurality of nozzles 10 of the ink-jet head 4 (S104). In a case that the nozzle 10 in the first high viscosity abnormal state is absent (S104: NO), the process proceeds to S106. If the nozzle 10 in the first high viscosity abnormal state is present (S104: YES), then the controller 80 executes the strong (intense) flushing process for the nozzle 10 in the first high viscosity abnormal state (S105), and the process proceeds to S106. In the strong flushing process for the nozzle 10 in the first high viscosity abnormal state, the controller 80 causes the ink-jet head 4 to perform the strong flushing for discharging the ink from the nozzle 10 in relation to the nozzle 10 in the first high viscosity abnormal state. Note that in this embodiment, the strong flushing is an example of a "second discharging operation". The ink-jet head 4, which performs the strong flushing, is an example of a "second discharger (second discharging means, second discharging unit)".

In S106, the controller 80 determines whether or not the nozzle 10 in the second high viscosity abnormal state is present in the plurality of nozzles 10 of the ink-jet head 4. In a case that the nozzle 10 in the second high viscosity abnormal state is absent (S106: NO), the controller 80 terminates the process. In a case that the nozzle 10 in the second high viscosity abnormal state is present (S106: YES), then the controller 80 executes the weak flushing process for the nozzle 10 in the second high viscosity abnormal state (S107), and the controller 80 terminates the process. In the weak flushing process for the nozzle 10 in the second high viscosity abnormal state, the controller 80 causes the ink-jet head 4 to perform the weak flushing for discharging the ink from the nozzle 10 in relation to the nozzle 10 in the second high viscosity abnormal state. The discharge amount of the ink in the weak flushing is smaller than the discharge amount of the ink in the strong flushing.

Effect

In this embodiment, the ejection state signal, which is outputted when the ejection state is the normal state, is the first ejection state signal. Further, the ejection state signal, which is outputted when the ejection state is the first high viscosity abnormal state, is the second ejection state signal. In view of the above, in this embodiment, the process to be performed thereafter is varied between the case in which the ejection state signal outputted when the ejection driving is performed is the first ejection state signal and the case in which the ejection state signal outputted when the ejection driving is performed is the second ejection state signal. Accordingly, it is possible to execute the appropriate process depending on whether the ejection state is the normal state or the first high viscosity abnormal state.

Further, in this embodiment, the ejection state signal, which is provided when the ejection state is the ejection amount abnormal state, is the third ejection state signal. In view of the above, in this embodiment, the process to be performed thereafter is varied between the case in which the ejection state signal outputted when the ejection driving is performed is the second ejection state signal and the case in which the ejection state signal outputted when the ejection driving is performed is the third ejection state signal. Accordingly, it is possible to execute the appropriate process depending on whether the ejection state is the first high viscosity abnormal state or the ejection amount abnormal state.

Further, in this embodiment, the ejection state signal, which is outputted when the ejection state is the second high viscosity abnormal state, is the fourth ejection state signal. In view of the above, in this embodiment, the process to be performed thereafter is varied between the case in which the ejection state signal provided when the ejection driving is performed is the second ejection state signal and the case in which the ejection state signal outputted when the ejection driving is performed is the fourth ejection state signal. Accordingly, it is possible to execute the appropriate process depending on whether the ejection state is the first high viscosity abnormal state or the second high viscosity abnormal state.

Further, in this embodiment, the timing at which the period T1*a* ends is the same timing as the timing at which the period T2*a* starts, and the timing at which the period T1*b* ends is the same timing as the timing at which the period T2*b* starts. Therefore, there is no interval between the period T1*a* and the period T2*a* and between the period T1*b* and the period T2*b*. Accordingly, it is possible to more correctly determine the case in which the ejection state signal outputted when the ejection driving is performed is the first ejection state signal and the case in which the ejection state signal outputted when the ejection driving is performed is the second ejection state signal.

Further, in this embodiment, the first condition is the same condition as the second condition. Therefore, it is possible to simplify the process.

Further, in this embodiment, the nozzle 10, in which the ejection state is the ejection amount abnormal state, can be recovered by the suction purge.

Further, the nozzle 10, which is in the first high viscosity abnormal state, can be recovered more easily as compared with the nozzle 10 in the ejection state abnormal state. In view of the above, in this embodiment, in a case that the nozzle 10 in the ejection amount abnormal state is present, the nozzle 10 is recovered by the suction purge. Further, in a case that the nozzle 10 in the ejection amount abnormal state is absent and the nozzle 10 in the first high viscosity abnormal state is present, then the nozzle 10 in the first high viscosity abnormal state is recovered by the strong flushing in which the ink discharge amount is small as compared with the suction purge. Accordingly, it is possible to suppress the amount of consumption of the ink as compared with a case in which the nozzle 10 in the first high viscosity abnormal state is recovered by the suction purge.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the suction purge is performed in a case that the nozzle 10 in the ejection amount abnormal state is present in the plurality of nozzles 10 of the ink-jet head 4. However, there is no limitation thereto. In a first modification, the controller 80 performs the process in accordance with a flow chart depicted in FIG. 7. Accordingly, the ejection state is determined for each of the plurality of nozzles 10 of the ink-jet head 4, and the process is performed depending on the result the determination.

The flow chart depicted in FIG. 7 will be explained in detail. After the ejection determining process of S101, and in a case that the nozzle 10 in the ejection amount abnormal state is present (S102: YES), the controller 80 executes the strong flushing process for the nozzle 10 in the ejection amount abnormal state (S301), and advances the process to S104. In the strong flushing process for the nozzle 10 in the ejection amount abnormal state in S301, the controller 80 causes the ink-jet head 4 to perform the strong flushing for the nozzle 10 in the ejection amount abnormal state. Note that in the first modification, the strong flushing is an example of a "first discharging operation", and the ink-jet head 4, which performs the strong flushing, is an example of a "first discharger". In a case that the nozzle 10 in the ejection amount abnormal state is absent (S102: NO), the process proceeds to S104.

In a case that the nozzle 10 in the first high viscosity abnormal state is present (S104: YES), then the controller 80 executes the middle flushing process for the nozzle 10 in the first high viscosity abnormal state (S302), and advance the process to S106. In the middle flushing process for the nozzle 10 in the first high viscosity abnormal state in S302, the controller 80 causes the ink-jet head 4 to perform the middle flushing for the nozzle 10 in the first high viscosity abnormal state in order to discharge the ink from the nozzle 10. The ink discharge amount from the nozzle 10 in the middle flushing is smaller than the ink discharge amount from the nozzle 10 in the strong flushing and larger than the ink discharge amount from the nozzle 10 in the weak flushing. Note that in the first modification, the middle flushing is an example of a "second discharging operation", and the ink-jet head 4, which performs the middle flushing, is an example of "second discharger". If the nozzle 10 in the first high viscosity abnormal state is absent (S104: NO), the process proceeds to S106.

In a case that the nozzle 10 in the second high viscosity abnormal state is present (S106: YES), then the controller 80 executes the weak flushing process for the nozzle 10 in the second high viscosity abnormal state (S303), and the controller 80 terminates the process. In the weak flushing process for the nozzle 10 in the second high viscosity abnormal state in S303, the controller 80 causes the ink-jet head 4 to perform the weak flushing for the nozzle 10 in the second high viscosity abnormal state. If the nozzle 10 in the second high viscosity abnormal state is absent (S106: NO), the controller 80 terminates the process.

The nozzle 10 in the first high viscosity abnormal state is easier to recover as compared with the nozzle 10 in the ejection amount abnormal state. In view of the above, in the first modification, the nozzle 10 in the ejection amount abnormal state is recovered by the strong flushing, and the nozzle 10 in the first high viscosity abnormal state is recovered by the middle flushing in which the ink discharge amount is smaller than that of the strong flushing. Accordingly, it is possible to suppress the amount of consumption of the ink as compared with a case in which the nozzle 10 in the first high viscosity abnormal state is recovered by the strong flushing.

Further, in the embodiment and the first modification described above, the nozzle 10 in the first high viscosity abnormal state is recovered by the flushing. However, there is no limitation thereto. For example, the maintenance unit 8 may be configured to perform, as the suction purge, the strong suction purge and the weak suction purge in which the ink discharge amount is smaller than that of the strong suction purge. Then, in a case that the nozzle 10 in the ejection amount abnormal state is present, the maintenance unit 8 may perform the strong suction purge. On the other hand, in a case that the nozzle 10 in the ejection amount abnormal state is absent, and the nozzle 10 in the first high viscosity abnormal state is present, then the maintenance unit 8 may perform the weak suction purge. In this case, more specifically, in a case that the nozzle 10 in the ejection amount abnormal state as well as the nozzle 10 in the first high viscosity abnormal state is absent, and the nozzle 10 in the second high viscosity abnormal state is present, then the maintenance unit 8 may perform the suction purge in which the ink discharge amount is smaller than that of the weak suction purge.

Further, in the embodiment described above, if at least one nozzle 10 in the ejection amount abnormal state is present, the suction purge is performed. However, there is no limitation thereto. In a second modification, the controller 80 performs the process in accordance with a flow chart depicted in FIG. 8. Accordingly, the ejection state is determined for each of the plurality of nozzles 10 of the ink-jet head 4, and the process is performed depending on the result of the determination.

The flow chart depicted in FIG. 8 will be explained in more detail below. After the ejection determining process of S101, and in a case that not less than a predetermined number (in this modification, the predetermined number is two) of nozzles 10 in the ejection amount abnormal state are present in the plurality of nozzles 10 of the ink-jet head 4 (S401: YES), the controller 80 executes the purge process (S402), and the controller 80 terminates the process. Note that in the second modification, the maintenance unit 8, which performs the suction purge, is an example of a "purger (purge unit, purge means)".

In a case that the number of the nozzles 10, of the plurality of nozzles 10 of the ink-jet head 4, in the ejection amount abnormal state is less than the predetermined number (S401: NO), then the controller 80 determines whether or not the abnormal nozzle 10 is present in the plurality of nozzles 10 of the ink-jet head 4 (S403). In this case, the abnormal nozzle 10 refers to the nozzle 10 in the ejection amount abnormal state, the nozzle 10 in the first high viscosity abnormal state, and the nozzle 10 in the second high viscosity abnormal state.

In a case that the abnormal nozzle 10 is absent (S403: NO), the controller 80 terminates the process. In a case that the abnormal nozzle 10 is present (S403: YES), then the controller 80 executes the flushing process for the abnormal nozzle (S404), and the controller 80 terminates the process. In the flushing process for the abnormal nozzle 10 in S404, the controller 80 causes the ink-jet head 4 to perform the flushing for discharging the ink from the nozzle 10 in relation to the abnormal nozzle 10. In the flushing, the ink discharge amount may be identical among the nozzle 10 in the ejection amount abnormal state, the nozzle 10 in the first high viscosity abnormal state, and the nozzle 10 in the second high viscosity abnormal state. Alternatively, in the flushing, the ink discharge amount may be varied among the nozzle 10 in the ejection amount abnormal state, the nozzle 10 in the first high viscosity abnormal state, and the nozzle 10 in the second high viscosity abnormal state, for example, in the same or similar manner as the first modification.

In the second modification, in a case that a large number of nozzles 10 are in the ejection amount abnormal state, it is possible to recover the nozzles 10 in the ejection amount abnormal state by the suction purge.

Further, in the embodiment described above, at least one of the strong flushing and the weak flushing is performed, and then the process is terminated irrelevant to whether or not the nozzle 10 is actually recovered by the strong flushing and the weak flushing. However, there is no limitation thereto. In a third modification, the controller 80 performs the process in accordance with a flow chart depicted in FIG. 9. Accordingly, the ejection state is determined for each of the plurality of nozzles 10 of the ink-jet head 4, and the process is performed depending on the result of the determination.

Also in the third modification, the controller 80 executes the processes of S101 to S107 in the same or similar manner as the embodiment described above. However, as depicted in FIG. 9, in the third modification, unlike the embodiment described above, the process proceeds to S501 in a case that it is determined in S106 that the nozzle 10 in the second high viscosity abnormal state is absent, or the process proceeds to S501 after executing the weak flushing process in S107. In S501, the controller 80 determines whether or not the flushing has been performed. In particular, the controller 80 determines whether or not at least one of the strong flushing and the weak flushing (that is, the strong flushing and/or the weak flushing) has been performed. In a case that the flushing has not been performed (S501: NO), the controller 80 terminates the process. In a case that the flushing has been performed (S501: YES), the controller 80 returns the process to S101 to execute the ejection determining process. Further, in the ejection determining process of S101 after S501, the ejection state may be determined for all of the nozzles 10 of the ink-jet head 4 in the same or similar manner as the ejection determining process of S101 performed firstly. Alternatively, the ejection state may be determined for only the nozzles 10 for which the strong flushing or the weak flushing has been performed.

In the third modification, the ink is discharged from the nozzles 10 in the first or second high viscosity abnormal state by the flushing, and then the ejection driving is performed again. Accordingly, it is possible to confirm whether or not the nozzle 10 subjected to the flushing is recovered.

Note that in the case of the third modification, the ejection determining process and at least one of the strong flushing process and the weak flushing process are repeated until all of the nozzles 10 in the first high viscosity abnormal state and the nozzles 10 in the second high viscosity abnormal state are recovered. However, there is no limitation thereto. For example, in a case that one or some of the nozzles 10 in the first high viscosity abnormal state and the nozzles 10 in the second high viscosity abnormal state is/are not recovered even when the processes are repeated predetermined number of times, then the process may be terminated. Further, in this procedure, the controller 80 may output a signal to display, for example, a message to notify the presence of any unrecovered nozzle 10 on, for example, an undepicted display unit of the printer 1 or an undepicted display of PC connected to the printer 1.

Further, the procedure, in which the operation is performed in order to recover the abnormal nozzle 10, is not limited to those explained above. In a fourth modification, the controller 80 performs the process in accordance with a flow chart depicted in FIG. 10. Accordingly, the ejection state is determined for each of the plurality of nozzles 10 of the ink-jet head 4, and the process is performed depending on the result of the determination.

An explanation will be made in more detail below. After the ejection determining process in S101, and in a case that not less than a predetermined number (in this modification, the predetermined number is two) of nozzles 10 in the ejection amount abnormal state are present in the plurality of nozzles 10 of the ink-jet head 4 (S601: YES), the controller 80 executes the purge process (S602) in the same or similar manner as the second modification, and the controller 80 terminates the process. Note that in the fourth modification, the ejection driving, which is performed in the ejection determining process in S101, is an example of a “first ejection driving”.

In a case that the number of nozzles 10, of the plurality of nozzles 10 of the ink-jet head 4, in the ejection amount abnormal state is less than the predetermined number (S601: NO), the controller 80 determines whether or not the abnormal nozzle 10 is present in the plurality of nozzles 10 of the ink-jet head 4 (S603). In this case, the abnormal nozzle 10 includes the nozzle 10 in the ejection amount abnormal state, the nozzle 10 in the first high viscosity abnormal state, and the nozzle 10 in the second high viscosity abnormal state.

In a case that the abnormal nozzle 10 is absent (S603: NO), the controller 80 terminates the process. In a case that the abnormal nozzle 10 is present (S603: YES), the controller 80 executes the flushing process for the nozzle 10 in the ejection amount abnormal state and the nozzle 10 in the high viscosity abnormal state (S604). In this case, the nozzle 10 in the high viscosity abnormal state includes the nozzle 10 in the first high viscosity abnormal state and the nozzle 10 in the second high viscosity abnormal state. In the flushing process in S604, the controller 80 causes the ink-jet head 4 to perform the flushing for the nozzle 10 in the ejection amount abnormal state and the nozzle 10 in the high viscosity abnormal state. In the flushing, an identical ink discharge amount may be set for each of the nozzle 10 in the ejection amount abnormal state, the nozzle 10 in the first high viscosity abnormal state, and the nozzle 10 in the second high viscosity abnormal state. Alternatively, in the flushing, ink discharge amounts different from each other may be respectively set for the nozzle 10 in the ejection amount abnormal state, the nozzle 10 in the first high viscosity abnormal state, and the nozzle 10 in the second high viscosity abnormal state, for example, in the same or similar manner as the first modification. Note that in the fourth modification, the flushing to be performed in S604 is an example of a “first flushing”.

Subsequently, the controller 80 executes the ejection determining process (S605). Also in the ejection determining process of S605, the controller 80 determines the ejection state of the nozzle 10 in the same or similar manner as the ejection determining process of S101. However, in the ejection determining process of S605, the controller 80 may determine the ejection state for all of the nozzles 10 of the ink-jet head 4, or the controller 80 may determine the ejection state for only the nozzles 10 for which the flushing has been performed in S604.

Subsequently, the controller 80 determines whether or not the nozzle 10 in the high viscosity abnormal state is present on the basis of the result of the ejection determining process of S605 (S606). In a case that the nozzle 10 in the high viscosity abnormal state is absent (S606: NO), the controller 80 terminates the process. In a case that the nozzle 10 in the high viscosity abnormal state is present (S606: YES), then the controller 80 executes the flushing process for the nozzle 10 in the high viscosity abnormal state (S607), and the controller 80 returns the process to S605. In the flushing process of S607, the controller 80 causes the ink-jet head 4 to perform the flushing for the nozzle 10 in the high viscosity abnormal state. In this flushing, the ink discharge amount of the nozzle 10 in the first high viscosity abnormal state may be the same as that of the nozzle 10 in the second high viscosity abnormal state. Alternatively, in this flushing, the ink discharge amount of the nozzle 10 in the first high viscosity abnormal state may be different from that of the nozzle 10 in the second high viscosity abnormal state. Note that in the flushing process of S607, the ink is not discharged from the nozzle 10 in the ejection amount abnormal state.

Note that in the fourth modification, the flushing performed in S607 is an example of a "second flushing". Further, in the fourth modification, the ejection driving, which is performed in the ejection determining process of S605 performed for the first time is an example of a "second ejection driving". The ejection driving, which is performed in the ejection determining process of S605 after the flushing process of S607, is an example of a "third ejection driving".

The possibility for the nozzle 10 in the ejection amount abnormal state to be recovered by the flushing is low as compared with the nozzle 10 in the high viscosity abnormal state. In view of the above, in the fourth modification, the first flushing is performed to discharge the ink from the nozzle 10 of which the ejection state signal outputted when the first ejection driving is performed is the second ejection state signal and the nozzle 10 of which the ejection state signal outputted when the first ejection driving is performed is the third ejection state signal. That is, in the first flushing, the ink is discharged from both of the nozzle 10 in the ejection amount abnormal state and the nozzle 10 in the high viscosity abnormal state. After that, the second ejection driving is performed, and thus it is possible to confirm whether or not the nozzle 10 is recovered by the first flushing. Further, the second flushing is performed such that the liquid is not discharged from the nozzle of which the ejection state signal outputted when the second ejection driving is performed is the third ejection state signal and the liquid is discharged from the nozzle of which the ejection state signal outputted when the second ejection driving is performed is the second ejection state signal. That is, in the second flushing, the ink is not discharged from the nozzle 10 in the ejection amount abnormal state, and the ink is discharged from the nozzle 10 in the high viscosity abnormal state. Accordingly, the ink is not discharged unnecessarily from the nozzle 10 in the ejection amount abnormal state which is somewhat difficult to recover by means of the flushing. Thus, it is possible to suppress the amount of consumption of the ink. Further, the third ejection driving is performed thereafter. Thus, it is possible to confirm whether or not the nozzle, for which the second flushing has been performed, is recovered.

Note that in the case of the fourth modification, the ejection determining process and the flushing for the nozzle 10 in the high viscosity abnormal state are repeated until all of the nozzles 10 in the high viscosity abnormal state are recovered. However, there is no limitation thereto. For example, in a case that the nozzle 10 in the high viscosity abnormal state is not recovered even when the processes are repeated a predetermined number of times, then the processes may be terminated. Further, in this procedure, the controller 80 may output a signal to display, for example, a message to notify the presence of any unrecovered nozzle 10 on, for example, an undepicted display unit of the printer 1 or an undepicted display of PC connected to the printer 1 in the same or similar manner as the third modification.

A fifth modification is an example of the case in which the ejection determining process is executed when a predetermined time comes. In the fifth modification, the controller 80 performs the process in accordance with a flow chart depicted in FIG. 11 during the period in which the electric power is supplied to the printer 1.

This feature will be explained in more detail below. The controller 80 waits until the predetermined time comes (S701: NO). In a case that the predetermined time comes (S701: YES), the controller 80 executes the ejection determining process (S702) in the same or similar manner as S101 of the embodiment described above. In this case, the controller 80 performs the determination of S701, for example, on the basis of the time indicated by an undepicted clock or timer contained in the printer 1.

Subsequently, the controller 80 determines whether or not the abnormal nozzle 10 is present in the plurality of nozzles 10 of the ink-jet head 4 on the basis of the result of the ejection determining process of S702 (S703). In a case that the abnormal nozzle 10 is absent (S703: NO), the controller 80 returns the process to S701. In a case that the abnormal nozzle 10 is present (S703: YES), the controller 80 executes the flushing process for the nozzle 10 in the ejection amount abnormal state and the nozzle 10 in the high viscosity abnormal state (S704).

Subsequently, the controller 80 waits during the period in which the recording instruction signal to give instruction to perform the recording on the recording paper S is not received (S705: NO) and the predetermined time on the next day does not come (S706: NO). Then, in a case that the predetermined time on the next day comes (S706: YES) without receiving the recording instruction signal (S705: NO), the process returns to S702.

In a case that the recording instruction signal is received (S705: YES), the controller 80 determines whether or not the nozzle 10 in the ejection amount abnormal state is present on the basis of the result of the ejection determining process of S702 (S707). In a case that the nozzle 10 in the ejection amount abnormal state is absent (S707: NO), the process proceeds to S709. In a case that the nozzle 10 in the ejection amount abnormal state is present (S707: YES), the controller 80 advances the process to S709 after executing the purge process.

In S709, the controller 80 executes the recording process. In the recording process, the controller 80 performs the recording on the recording paper S by repeatedly performing the recording pass in which the ink-jet head 4 is caused to eject the inks from the plurality of nozzles 10 while moving the carriage 2 in the scanning direction by controlling the carriage motor 86 and the conveyance operation in which the conveying rollers 6, 7 are caused to convey the recording paper S by controlling the conveyance motor 87. Then, after the recording process of S709, the process returns to S701.

At the predetermined time, the flushing is performed, in which the ink is discharged from the nozzle 10 in the first high viscosity abnormal state and the nozzle 10 in the ejection amount abnormal state. Thus, it is possible to recover those nozzles 10. The predetermined time is set in some cases to such a time that the printer 1 is not used and the noise or din causes any problem, for example, in the middle of the night. Therefore, it is possible to suppress the occurrence of the noise or din by means of the prohibition of the suction purge at the predetermined time. Further, in a case that the nozzle 10 in the ejection amount abnormal state is present, the suction purge is performed immediately before the execution of the recording on the recording paper S to be performed initially thereafter. Accordingly, it is possible to reliably recover the nozzle 10 in the ejection amount abnormal state by the suction purge at the timing at which the printer 1 is used and the noise or din hardly causes the problem.

Further, in the embodiment described above, it is determined whether the ejection state of the nozzle 10 is the normal state, the ejection amount abnormal state, the first high viscosity abnormal state, or the second high viscosity abnormal state, and the process is executed depending on the ejection state. However, there is no limitation thereto.

For example, in the embodiment described above, in a case that the voltage value of the ejection state signal becomes not less than the threshold value Vmax in both of the periods T1*a*, T2*a* and not more than the threshold value Vmin in both of the periods T1*b*, T2*b*, then information indicating the normal state may be stored in the flash memory 84, or the information indicating the first high viscosity abnormal state may be stored in the flash memory 84. Alternatively, in this case, it is also adoptable that the flash memory 84 may store any one of the information indicating the normal state and the information indicating the first high viscosity abnormal state, on the basis of at least one of the magnitude correlation between the maximum value in the period T1*a* and the maximum value in the period T2*a* of the voltage value of the ejection state signal and the magnitude correlation between the minimum value in the period T1*b* and the minimum value in the period T2*b* of the voltage value of the ejection state signal.

In a sixth modification, it is determined whether the ejection state of the nozzle 10 is the normal state, the ejection amount abnormal state, the first high viscosity abnormal state, the second high viscosity abnormal state, a third high viscosity abnormal state in which the viscosity of the ink is higher than that in the first high viscosity abnormal state, or a fourth high viscosity abnormal state in which the viscosity of the ink is higher than that in the first high viscosity abnormal state and lower than that in the third high viscosity abnormal state. The process is executed depending on the ejection state.

An explanation will be made in detail below. In a case that the ejection state is the third high viscosity abnormal state, the time, which is required until the ink is ejected from the nozzle 10 after the start of the ejection driving, is longer than that in the first high viscosity abnormal state. On this account, as depicted by a solid line in FIG. 12A, the change of the ejection state signal provided when the ejection state is the third high viscosity abnormal state is delayed from the change provided when the ejection state is the first high viscosity abnormal state. On this account, the ejection state signal, which is outputted when the ejection state is the third high viscosity abnormal state, does not fulfill the condition that the voltage value of the ejection state signal becomes not less than the threshold value Vmax in the period T1*a* and not more than the threshold value Vmin in the period T1*b*, does not fulfill the condition that the voltage value of the ejection state signal becomes not less than the threshold value Vmax in the period T2*a* and not more than the threshold value Vmin in the period T2*b*, and fulfills the condition that the voltage value of the ejection state signal becomes not less than the threshold value Vmax in the period T3*a* after the period T2*a* and not more than the threshold value Vmin in the period T3*b* after the period T2*b*.

In a case that the ejection state is the fourth high viscosity abnormal state, the time, which is required until the ink is ejected from the nozzle 10 after the start of the ejection driving, is longer than that in the first high viscosity abnormal state and shorter than that in the third high viscosity abnormal state. On this account, as depicted by a solid line in FIG. 12B, the change of the ejection state signal, which is provided when the ejection state is the fourth high viscosity abnormal state, is delayed as compared with the change which is provided when the ejection state is the first high viscosity abnormal state and advanced as compared with the change which is provided when the ejection state is the third high viscosity abnormal state. On this account, the ejection state signal, which is outputted when the ejection state is the fourth high viscosity abnormal state, does not fulfill the condition that the voltage value of the ejection state signal becomes not less than the threshold value Vmax in the period T1*a* and not more than the threshold value Vmin in the period T1*b*, fulfills the condition that the voltage value of the ejection state signal becomes not less than the threshold value Vmax in the period T2*a* and not more than the threshold value Vmin in the period T2*b*, and fulfills the condition that the voltage value of the ejection state signal becomes not less than the threshold value Vmax in the period T3*a* after the period T2*a* and not more than the threshold value Vmin in the period T3*b* after the period T2*b*.

Note that in the sixth modification, the ejection state signal, which is depicted by the solid line in FIG. 12A, is an example of a "fifth ejection state signal", and the combination of the periods T3*a*, T3*b* is an example of a "third period". Further, in the sixth modification, the timing, at which the period T2*a* ends, is the same timing as the timing at which the period T3*a* starts. Further, in the sixth modification, the timing, at which the period T2*b* ends, is the same timing as the timing at which the period T3*b* starts.

Further, in the sixth modification, the first ejection state signal fulfills the condition that the voltage value of the first ejection state signal becomes not less than the threshold value Vmax in the period T1*a* and not more than the threshold value Vmin in the period T1*b*, does not fulfill the condition that the voltage value of the first ejection state signal becomes not less than the threshold value Vmax in the period T2*a* and not more than the threshold value Vmin in the period T2*b*, and does not fulfill the condition that the voltage value of the first ejection state signal becomes not less than the threshold value Vmax in the period T3*a* and not more than the threshold value Vmin in the period T3*b*. Further, in the sixth modification, the second ejection state signal does not fulfill the condition that the voltage value of the second ejection state signal becomes not less than the threshold value Vmax in the period T1*a* and not more than the threshold value Vmin in the period T1*b*, fulfills the condition that the voltage value of the second ejection state signal becomes not less than the threshold value Vmax in the period T2*a* and not more than the threshold value Vmin in the period T2*b*, and does not fulfill the condition that the voltage value of the second ejection state signal becomes not less than the threshold value Vmax in the period T3*a* and not more than the threshold value Vmin in the period T3*b*.

Further, in the sixth modification, the combination of the condition that the voltage value of the ejection state signal becomes not less than the threshold value Vmax and the condition that the voltage value of the ejection state signal becomes not more than the threshold value Vmin is an example of each of a "first condition", a "second condition", and a "third condition". That is, in this modification, the first condition, the second condition, and the third condition are the same condition as each other.

Then, in the sixth modification, the controller 80 performs the process in accordance with a flow chart depicted in FIG. 12C. Accordingly, the ejection state is determined for each of the plurality of nozzles 10 of the ink-jet head 4, and the process is performed depending on the result of the determination.

An explanation will be made in more detail below. At first, the controller 80 executes the ejection determining process (S801). In the ejection determining process of S801, the controller performs the process in accordance with a flow chart depicted in FIGS. 13A and 13B.

The flow chart depicted in FIGS. 13A and 13B will be explained in detail below. The controller 80 executes the processes of S201 and S202 in the same or similar manner as the ejection determining process of S101 of the embodiment described above.

Subsequently, in a case that the ejection state signal outputted from the signal processing circuit 78 when the ejection driving is performed in S202 fulfills the condition that the voltage value of the ejection state signal becomes not less than the threshold value Vmax in the period T1$a$ and not more than the threshold value Vmin in the period T1$b$ (S901: YES), does not fulfill the condition that the voltage value of the ejection state signal becomes not less than the threshold value Vmax in the period T2$a$ and not more than the threshold value Vmin in the period T2$b$ (S902: NO), and does not fulfill the condition that the voltage value of the ejection state signal becomes not less than the threshold value Vmax in the period T3$a$ and not more than the threshold value Vmin in the period T3$b$ (S903: NO), then the controller 80 causes the flash memory 84 to store information indicating that the ejection state of the target nozzle is the normal state (S904).

Further, in a case that the ejection state signal outputted from the signal processing circuit 78 when the ejection driving is performed in S202 fulfills the condition that the voltage value of the ejection state signal becomes not less than the threshold value Vmax in the period T1$a$ and not more than the threshold value Vmin in the period T1$b$ (S901: YES), does not fulfill the condition that the voltage value of the ejection state signal becomes not less than the threshold value Vmax in the period T2$a$ and not more than the threshold value Vmin in the period T2$b$ (S902: NO), and fulfills the condition that the voltage value of the ejection state signal becomes not less than the threshold value Vmax in the period T3$a$ and not more than the threshold value Vmin in the period T3$b$ (S903: YES), then the process returns to S202. Note that the ejection state signal provided in this case is an example of a “seventh ejection state signal”.

Further, in a case that the ejection state signal outputted from the signal processing circuit 78 when the ejection driving is performed in S202 fulfills the condition that the voltage value of the ejection state signal becomes not less than the threshold value Vmax in the period T1$a$ and not more than the threshold value Vmin in the period T1$b$ (S901: YES), fulfills the condition that the voltage value of the ejection state signal becomes not less than the threshold value Vmax in the period T2$a$ and not more than the threshold value Vmin in the period T2$b$ (S902: YES), and does not fulfill the condition that the voltage value of the ejection state signal becomes not less than the threshold value Vmax in the period T3$a$ and not more than the threshold value Vmin in the period T3$b$ (S903: NO), then the controller 80 causes the flash memory 84 to store information indicating that the ejection state of the target nozzle is the second high viscosity abnormal state (S906).

Further, in a case that the ejection state signal outputted from the signal processing circuit 78 when the ejection driving is performed in S202 fulfills the condition that the voltage value of the ejection state signal becomes not less than the threshold value Vmax in the period T1$a$ and not more than the threshold value Vmin in the period T1$b$ (S901: YES), fulfills the condition that the voltage value of the ejection state signal becomes not less than the threshold value Vmax in the period T2$a$ and not more than the threshold value Vmin in the period T2$b$ (S902: YES), and fulfills the condition that the voltage value of the ejection state signal becomes not less than the threshold value Vmax in the period T3$a$ and not more than the threshold value Vmin in the period T3$b$ (S905: YES), then the controller 80 returns the process to S202. Note that the ejection state signal provided in this case is an example of an “eighth ejection state signal”.

Further, in a case that the ejection state signal outputted from the signal processing circuit 78 when the ejection driving is performed in S202 does not fulfill the condition that the voltage value of the ejection state signal becomes not less than the threshold value Vmax in the period T1$a$ and not more than the threshold value Vmin in the period T1$b$ (S901: NO), fulfills the condition that the voltage value of the ejection state signal becomes not less than the threshold value Vmax in the period T2$a$ and not more than the threshold value Vmin in the period T2$b$ (S907: YES), and does not fulfill the condition that the voltage value of the ejection state signal becomes not less than the threshold value Vmax in the period T3$a$ and not more than the threshold value Vmin in the period T3$b$ (S908: NO), then the controller 80 causes the flash memory 84 to store information indicating that the ejection state of the target nozzle is the first high viscosity abnormal state (S909).

Further, in a case that the ejection state signal outputted from the signal processing circuit 78 when the ejection driving is performed in S202 does not fulfill the condition that the voltage value of the ejection state signal becomes not less than the threshold value Vmax in the period T1$a$ and not more than the threshold value Vmin in the period T1$b$ (S901: NO), fulfills the condition that the voltage value of the ejection state signal becomes not less than the threshold value Vmax in the period T2$a$ and not more than the threshold value Vmin in the period T2$b$ (S907: YES), and fulfills the condition that the voltage value of the ejection state signal becomes not less than the threshold value Vmax in the period T3$a$ and not more than the threshold value Vmin in the period T3$b$ (S908: YES), then the controller 80 causes the flash memory 84 to store information indicating that the ejection state of the target nozzle is the fourth high viscosity abnormal state (S910).

Further, in a case that the ejection state signal outputted from the signal processing circuit 78 when the ejection driving is performed in S202 does not fulfill the condition that the voltage value of the ejection state signal becomes not less than the threshold value Vmax in the period T1$a$ and not more than the threshold value Vmin in the period T1$b$ (S901: NO), does not fulfill the condition that the voltage value of the ejection state signal becomes not less than the threshold value Vmax in the period T2$a$ and not more than the threshold value Vmin in the period T2$b$ (S907: NO), and fulfills the condition that the voltage value of the ejection state signal becomes not less than the threshold value Vmax in the period T3$a$ and not more than the threshold value Vmin in the period T3$b$ (S911: YES), then the controller 80 causes the flash memory 84 to store information indicating that the ejection state of the target nozzle is the third high viscosity abnormal state (S912).

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S901: NO), does not fulfill the condition that the voltage value of the ejection state signal becomes not less than the threshold value Vmax in the period T2*a* and not more than the threshold value Vmin in the period T2*b* (S907: NO), and does not fulfill the condition that the voltage value of the ejection state signal becomes not less than the threshold value Vmax in the period T3*a* and not more than the threshold value Vmin in the period T3*b* (S911: NO), then the controller 80 causes the flash memory 84 to store information indicating that the ejection state of the target nozzle is the ejection amount abnormal state (S913).

Further, the controller 80 executes the processes of S210 and S211 in the same or similar manner as the ejection determining process of S101 of the embodiment described above after the processes of S904, S906, S909, S910, S912, and S913.

With reference to FIG. 12C again, in a case that the nozzle 10 in the ejection amount abnormal state is present (S802: YES), then the controller 80 executes the purge process (S803), and the controller 80 terminates the process. In a case that the nozzle 10 in the ejection amount abnormal state is absent (S802: NO), the controller 80 determines whether or not the nozzle 10 in the high viscosity abnormal state is present in the plurality of nozzles 10 of the ink-jet head 4 (S804). The nozzle 10 in the high viscosity abnormal state in S804 includes the nozzle 10 in the first high viscosity abnormal state, the nozzle 10 in the second high viscosity abnormal state, the nozzle 10 in the third high viscosity abnormal state, and the nozzle 10 in the fourth high viscosity abnormal state. In a case that the nozzle 10 in the high viscosity abnormal state is absent (S804: NO), the controller 80 terminates the process. In a case that the nozzle 10 in the high viscosity abnormal state is present (S804: YES), then the controller 80 executes the flushing process for the nozzle 10 in the high viscosity abnormal state (S805), and the controller 80 terminates the process.

In the flushing process of S805, the controller 80 causes the ink-jet head 4 to perform the flushing for the nozzle 10 in the high viscosity abnormal state. In this procedure, the ink discharge amount brought about by the flushing from the nozzle 10 in the fourth high viscosity abnormal state may be smaller than the ink discharge amount brought about by the flushing from the nozzle 10 in the third high viscosity abnormal state, or may be the same as the ink discharge amount brought about by the flushing from the nozzle 10 in the third high viscosity abnormal state. Further, the ink discharge amount brought about by the flushing from the nozzle 10 in the first high viscosity abnormal state may be smaller than the ink discharge amount brought about by the flushing from the nozzle 10 in the fourth high viscosity abnormal state, or may be the same as the ink discharge amount brought about by the flushing from the nozzle 10 in the fourth high viscosity abnormal state. Further, the ink discharge amount brought about by the flushing from the nozzle 10 in the second high viscosity abnormal state may be smaller than the ink discharge amount brought about by the flushing from the nozzle 10 in the first high viscosity abnormal state, or may be the same as the ink discharge amount brought about by the flushing from the nozzle 10 in the first high viscosity abnormal state.

In the sixth modification, the ejection state signal provided when the ejection state is the normal state is the first ejection state signal, the ejection state signal provided when the ejection state is the first high viscosity abnormal state is the second ejection state signal, and the ejection state signal provided when the ejection state is the third high viscosity abnormal state is the fifth ejection state signal. In the sixth modification, the process to be performed thereafter is varied between the case in which the ejection state signal outputted when the ejection driving is performed is the second ejection state signal and the case in which the ejection state signal outputted when the ejection driving is performed is the fifth ejection state signal. Accordingly, it is possible to execute the appropriate process depending on whether the ejection state is the first high viscosity abnormal state or the third high viscosity abnormal state.

Further, in the sixth modification, the first condition is the same condition as the third condition. Therefore, it is possible to simplify the process as compared with a case in which the first condition and the third condition are different from each other.

Further, in ordinary cases, irrelevant to the ejection state of the nozzle 10, it is hardly conceived that the ejection state signal outputted when the ejection driving is performed is the seventh ejection state signal or the eighth ejection state signal. Therefore, in a case that the ejection state signal outputted when the ejection driving is performed is the seventh ejection state signal or the eighth ejection state signal, it is highly possible that the ejection state signal does not correctly indicate the ejection state. In view of the above, in the sixth modification, in a case that the ejection state signal provided when the ejection driving is performed is the seventh ejection state signal or the eighth ejection state signal, the ink-jet head 4 is caused to perform the ejection driving again. Accordingly, it is possible to execute the appropriate process depending on the ejection state indicated by the ejection state signal outputted when the ejection driving is performed again.

In a seventh modification, it is determined whether the ejection state of the nozzle 10 is the normal state, the ejection amount abnormal state, the first high viscosity abnormal state, the second high viscosity abnormal state, the first low viscosity abnormal state in which the viscosity of the ink is lower than that in the normal state, or the second low viscosity abnormal state in which the viscosity of the ink is lower than that in the normal state and the viscosity of the ink is higher than that in the first low viscosity abnormal state. Then, the process is executed depending on the ejection state.

An explanation will be made in more detail below. When the ejection state is the first low viscosity abnormal state, the time, which is required until the ink is ejected from the nozzle 10 after the start of the ejection driving, is shorter than that in the normal state. On this account, as depicted by a solid line in FIG. 14A, the change of the ejection state signal, which is provided when the ejection state is the first low viscosity abnormal state, is advanced as compared with the change in the normal state. On this account, the ejection state signal, which is outputted when the ejection state is the first low viscosity abnormal state, does not fulfill the condition that the voltage value of the ejection state signal becomes not less than the threshold value Vmax in the period T1*a* and not more than the threshold value Vmin in the period T1*b*, does not fulfill the condition that the voltage value of the ejection state signal becomes not less than the threshold value Vmax in the period T2*a* and not more than the threshold value Vmin in the period T2*b*, and fulfills the condition that the voltage value of the ejection state signal becomes not less than the threshold value Vmax in the period T4*a* before the period T1*a* and not more than the threshold value Vmin in the period T4*b* before the period T1*b*.

When the ejection state is the second low viscosity abnormal state, the time, which is required until the ink is ejected from the nozzle 10 after the start of the ejection driving, is shorter than that in the normal state and longer than that in the first low viscosity abnormal state. On this account, as depicted by a solid line in FIG. 14B, the change of the ejection state signal, which is provided when the ejection state is the second low viscosity abnormal state, is advanced as compared with the change in the normal state and delayed as compared with the change in the first low viscosity abnormal state. On this account, the ejection state signal, which is provided when the ejection state is the second low viscosity abnormal state, fulfills the condition that the voltage value of the ejection state signal becomes not less than the threshold value Vmax in the period T1*a* and not more than the threshold value Vmin in the period T1*b*, does not fulfill the condition that the voltage value of the ejection state signal becomes not less than the threshold value Vmax in the period T2*a* and not more than the threshold value Vmin in the period T2*b*, and fulfills the condition that the voltage value of the ejection state signal becomes not less than the threshold value Vmax in the period T4*a* before the period T1*a* and not more than the threshold value Vmin in the period T4*b* before the period T1*b*.

Note that in the seventh modification, the ejection state signal, which is depicted by the solid line in FIG. 14A, is an example of a "sixth ejection state signal". The combination of the periods T4*a*, T4*b* is an example of a "fourth period". Further, in the seventh modification, the timing, at which the period T4*a* ends, is the same timing as the timing at which the period T1*a* starts. Further, in the seventh modification, the timing, at which the period T4*b* ends, is the same timing as the timing at which the period T1*b* starts.

Further, in the seventh modification, the first ejection state signal fulfills the condition that the voltage value of the first ejection state signal becomes not less than the threshold value Vmax in the period T1*a* and not more than the threshold value Vmin in the period T1*b*, does not fulfill the condition that the voltage value of the first ejection state signal becomes not less than the threshold value Vmax in the period T2*a* and not more than the threshold value Vmin in the period T2*b*, and does not fulfill the condition that the voltage value of the first ejection state signal becomes not less than the threshold value Vmax in the period T4*a* and not more than the threshold value Vmin in the period T4*b*. Further, in the seventh modification, the second ejection state signal does not fulfill the condition that the voltage value of the second ejection state signal becomes not less than the threshold value Vmax in the period T1*a* and not more than the threshold value Vmin in the period T1*b*, fulfills the condition that the voltage value of the second ejection state signal becomes not less than the threshold value Vmax in the period T2*a* and not more than the threshold value Vmin in the period T2*b*, and does not fulfill the condition that the voltage value of the second ejection state signal becomes not less than the threshold value Vmax in the period T4*a* and not more than the threshold value Vmin in the period T4*b*.

Further, in the seventh modification, the combination of the condition that the voltage value of the ejection state signal becomes not less than the threshold value Vmax and the condition that the voltage value of the ejection state signal becomes not more than the threshold value Vmin is an example of each of a "first condition", a "second condition", and a "fourth condition". That is, in this embodiment, the first condition, the second condition, and the fourth condition are the same condition as each other.

Then, in the seventh modification, the controller 80 performs the process in accordance with a flow chart depicted in FIG. 14C. Accordingly, the ejection state is determined for each of the plurality of nozzles 10 of the ink-jet head 4. The controller 80 performs the process depending on the result of the determination.

An explanation will be made in more detail below. At first, the controller 80 executes the ejection determining process (S1001). In the ejection determining process of S1001, the controller 80 performs the process in accordance with a flow chart depicted in FIGS. 15A and 15B.

The flow chart depicted in FIGS. 15A and 15B will be explained in detail below. The controller 80 executes the processes of S201, S202 in the same or similar manner as the ejection determining process of S101 of the embodiment described above.

Subsequently, in a case that the ejection state signal outputted from the signal processing circuit 78 when the ejection driving is performed in S202 fulfills the condition that the voltage value of the ejection state signal becomes not less than the threshold value Vmax in the period T1*a* and not more than the threshold value Vmin in the period T1*b* (S1101: YES), does not fulfill the condition that the voltage value becomes not less than the threshold value Vmax in the period T2*a* and not more than the threshold value Vmin in the period T2*b* (S1102: NO), and does not fulfill the condition that the voltage value becomes not less than the threshold value Vmax in the period T4*a* and not more than the threshold value Vmin in the period T4*b* (S1103: NO), then the controller 80 causes the flash memory 84 to store information indicating that the ejection state of the target nozzle is the normal state (S1104).

Further, in a case that the ejection state signal outputted from the signal processing circuit 78 when the ejection driving is performed in S202 fulfills the condition that the voltage value of the ejection state signal becomes not less than the threshold value Vmax in the period T1*a* and not more than the threshold value Vmin in the period T1*b* (S1101: YES), does not fulfill the condition that the voltage value of the ejection state signal becomes not less than the threshold value Vmax in the period T2*a* and not more than the threshold value Vmin in the period T2*b* (S1102: NO), and fulfills the condition that the voltage value of the ejection state signal becomes not less than the threshold value Vmax in the period T4*a* and not more than the threshold value Vmin in the period T4*b* (S1103: YES), then the controller 80 causes the flash memory 84 to store information indicating that the ejection state of the target nozzle is the second low viscosity abnormal state (S1105).

Further, in a case that the ejection state signal outputted from the signal processing circuit 78 when the ejection driving is performed in S202 fulfills the condition that the voltage value of the ejection state signal becomes not less than the threshold value Vmax in the period T1*a* and not more than the threshold value Vmin in the period T1*b* (S1101: YES), fulfills the condition that the voltage value becomes not less than the threshold value Vmax in the period T2*a* and not more than the threshold value Vmin in the period T2*b* (S1102: YES), and does not fulfill the condition that the voltage value becomes not less than the threshold value Vmax in the period T4*a* and not more than the threshold value Vmin in the period T4*b* (S1103: NO), then the controller 80 causes the flash memory 84 to store information indicating that the ejection state of the target nozzle is the second high viscosity abnormal state (S1107).

Further, in a case that the ejection state signal outputted from the signal processing circuit 78 when the ejection driving is performed in S202 fulfills the condition that the voltage value of the ejection state signal becomes not less than the threshold value Vmax in the period T1*a* and not more than the threshold value Vmin in the period T1*b* (S1101: YES), fulfills the condition that the voltage value of the ejection state signal becomes not less than the threshold value Vmax in the period T2*a* and not more than the threshold value Vmin in the period T2*b* (S1102: YES), and fulfills the condition that the voltage value of the ejection state signal becomes not less than the threshold value Vmax in the period T4*a* and not more than the threshold value Vmin in the period T4*b* (S1106: YES), then the process returns to S202.

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S1101: NO), fulfills the condition that the voltage value of the ejection state signal becomes not less than the threshold value Vmax in the period T2*a* and not more than the threshold value Vmin in the period T2*b* (S1102: YES), and does not fulfill the condition that the voltage value of the ejection state signal becomes not less than the threshold value Vmax in the period T4*a* and not more than the threshold value Vmin in the period T4*b* (S1109: NO), then the controller 80 causes the flash memory 84 to store information indicating that the ejection state of the target nozzle is the first high viscosity abnormal state (S1110).

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S1101: NO), fulfills the condition that the voltage value of the ejection state signal becomes not less than the threshold value Vmax in the period T2*a* and not more than the threshold value Vmin in the period T2*b* (S1108: YES), and fulfills the condition that the voltage value of the ejection state signal becomes not less than the threshold value Vmax in the period T4*a* and not more than the threshold value Vmin in the period T4*b* (S1109: YES), then the process returns to S202.

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S1101: NO), does not fulfill the condition that the voltage value of the ejection signal becomes not less than the threshold value Vmax in the period T2*a* and not more than the threshold value Vmin in the period T2*b* (S1108: NO), and fulfills the condition that the voltage value of the ejection state signal becomes not less than the threshold value Vmax in the period T4*a* and not more than the threshold value Vmin in the period T4*b* (S1111: YES), then the controller 80 causes the flash memory 84 to store information indicating that the ejection state of the target nozzle is the first low viscosity abnormal state (S1112).

Further, in a case that the ejection state signal outputted from the signal processing circuit 78 when the ejection driving is performed in S202 does not fulfill the condition that the voltage value of the ejection state signal becomes not less than the threshold value Vmax in the period T1*a* and not more than the threshold value Vmin in the period T1*b* (S1101: NO), does not fulfill the condition that the voltage value of the ejection state signal becomes not less than the threshold value Vmax in the period T2*a* and not more than the threshold value Vmin in the period T2*b* (S1108: NO), and does not fulfill the condition that the voltage value of the ejection state signal becomes not less than the threshold value Vmax in the period T4*a* and not more than the threshold value Vmin in the period T4*b* (S1111: NO), then the controller 80 causes the flash memory 84 to store information indicating that the ejection state of the target nozzle is the ejection amount abnormal state (S1113).

Further, the controller 80 executes the processes of S210 and S211 in the same or similar manner as the ejection determining process of S101 of the embodiment described above after the processes of S1104, S1105, S1107, S1110, S1112, and S1113.

With reference to FIG. 14C again, in a case that the nozzle 10 in the ejection amount abnormal state is present (S1002: YES), then the controller 80 executes the purge process (S1003), and the controller 80 terminates the process. In a case that the nozzle 10 in the ejection amount abnormal state is absent (S1002: NO), the controller 80 determines whether or not the nozzle 10 in the high viscosity abnormal state is present in the plurality of nozzles 10 of the ink-jet head 4 (S1004). The nozzle 10 in the high viscosity abnormal state in S1004 includes the nozzle 10 in the first high viscosity abnormal state and the nozzle 10 in the second high viscosity abnormal state. In a case that the nozzle 10 in the high viscosity abnormal state is absent (S1004: NO), the process proceeds to S1006. In a case that the nozzle 10 in the high viscosity abnormal state is present (S1004: YES), then the controller 80 executes the flushing process for the nozzle 10 in the high viscosity abnormal state (S1005), and the process proceeds to S1006.

In the flushing process of S1005, the controller 80 causes the ink-jet head 4 to perform the flushing for the nozzle 10 in the high viscosity abnormal state. In this procedure, the ink discharge amount brought about by the flushing from the nozzle 10 in the second high viscosity abnormal state may be smaller than the ink discharge amount brought about by the flushing from the nozzle 10 in the first high viscosity abnormal state, or may be the same as the ink discharge amount brought about by the flushing from the nozzle 10 in the first high viscosity abnormal state.

In S1006, the controller 80 determines whether or not the nozzle 10 in the low viscosity abnormal state is present in the plurality of nozzles 10 of the ink-jet head 4. The nozzle 10 in the low viscosity abnormal state in S1006 includes the nozzle 10 in the first low viscosity abnormal state and the nozzle 10 in the second low viscosity abnormal state. In a case that the nozzle 10 in the low viscosity abnormal state is absent (S1006: NO), the controller 80 terminates the process. In a case that the nozzle 10 in the low viscosity abnormal state is present (S1006: YES), then the controller 80 executes the flushing process for the nozzle 10 in the low viscosity abnormal state (S1007), and the controller 80 terminates the process.

In the flushing process of S1007, the controller 80 causes the ink-jet head 4 to perform the flushing for the nozzle 10 in the low viscosity abnormal state. The ink discharge amount brought about by the flushing from the nozzle 10 in the low viscosity abnormal state is smaller than the ink discharge amount brought about by the flushing from the nozzle 10 in the high viscosity abnormal state. Further, the ink discharge amount brought about by the flushing from the nozzle 10 in the second low viscosity abnormal state may be smaller than the ink discharge amount brought about by the flushing from the nozzle 10 in the first low viscosity abnormal state or may be the same as the ink discharge amount brought about by the flushing from the nozzle 10 in the first low viscosity abnormal state.

In the seventh modification, in a case that the ejection state is the normal state, the ejection state signal is the first ejection state signal. In a case that the ejection state is the first high viscosity abnormal state, the ejection state signal is the second ejection state signal. In a case that the ejection state is the first low viscosity abnormal state, the ejection state signal is the sixth ejection state. In the seventh modification, the process to be performed thereafter is varied between the case in which the ejection state signal outputted when the ejection driving is performed is the second ejection state signal and the case in which the ejection state signal outputted when the ejection driving is performed is the sixth ejection state signal. Accordingly, it is possible to execute the appropriate process depending on whether the ejection state is the high viscosity abnormal state or the low viscosity abnormal state.

Further, in the seventh modification, the first condition is the same condition as the fourth condition. Therefore, it is possible to simplify the process as compared with a case in which the first condition and the fourth condition are different from each other.

Further, as for the first to fourth high viscosity abnormal states and the first and second low viscosity abnormal states, the number and the combination of the viscosity abnormal states to be determined are not limited to those explained in the foregoing exemplary cases. As for the first to fourth high viscosity abnormal states and the first and second low viscosity abnormal states, the number and the combination of the viscosity abnormal states to be determined may be different from those explained in the foregoing exemplary cases.

Further, the exemplary case has been explained above, in which the process to recover the nozzle 10 is varied depending on the ink ejection state of the nozzle 10. However, there is no limitation thereto.

In an eighth modification, when a recording instruction signal, which gives instruction to perform the recording on the recording paper S, is received, the controller 80 performs the process in accordance with a flow chart depicted in FIG. 16.

An explanation will be made in more detail below. When the recording instruction signal is received, the controller 80 executes the ejection determining process (S1201) in the same or similar manner as S101 of the embodiment described above. Subsequently, the controller 80 determines whether or not the nozzle 10 in the ejection amount abnormal state is present in the plurality of nozzles 10 of the ink-jet head 4 (S1202) on the basis of the result of the ejection determining process of S1201. In a case that the nozzle 10 in the ejection amount abnormal state is present (S1202: YES), then the controller 80 executes the purge process (S1203), and then the controller 80 executes the first recording process (S1204). In the first recording process, the controller 80 performs the recording on the recording paper S by repeatedly performing the recording pass and the conveyance operation in the same or similar manner as explained in the fifth modification.

In a case that the nozzle 10 in the ejection amount abnormal state is absent (S1202: NO), the controller 80 determines whether or not the nozzle 10 in the high viscosity abnormal state is present in the plurality of nozzles 10 of the ink-jet head 4 (S1205). In a case that the nozzle 10 in the high viscosity abnormal state is absent (S1205: NO), the controller 80 executes the first recording process (S1204).

In a case that the nozzle 10 in the high viscosity abnormal state is present (S1205: YES), the controller 80 executes the second recording process (S1206). In the second recording process, the controller 80 performs the recording on the recording paper S by repeatedly performing the recording pass and the conveyance operation. However, in the second recording process, the recording is performed on the recording paper S in a mode different from that of the first recording process. For example, in the second recording process, the movement speed of the carriage 2 is slowed down in the recording pass as compared with the first recording process, and the cycle for ejecting the ink from the nozzle 10 is prolonged.

Note that in the eighth modification, a combination of the recording pass and the conveyance operation, which are repeatedly performed in accordance with the first recording process, is an example of a “first ejection process”. Further, the combination of the recording pass and the conveyance operation, which are repeatedly performed in accordance with the second recording process, is an example of a “second ejection process”.

The time, which is required until the ink is landed on the recording paper S after driving the ink-jet head 4 so that the ink is ejected from the nozzle 10 toward the recording paper S, changes between the case in which the ejection state is the normal state and the case in which the ejection state is the high viscosity abnormal state. In view of the above, in the eighth modification, the driving mode of the ink-jet head 4, which is provided when the recording is performed by ejecting the ink from the nozzle 10 to the recording paper S, is varied between the case in which the ejection state is the normal state and the case in which the ejection state is the high viscosity abnormal state. Accordingly, it is possible to perform the recording by landing the ink at the appropriate position on the recording paper S irrelevant to whether the ejection state is the normal state or the high viscosity abnormal state.

Further, in the eighth modification, the purge process is executed in a case that at least one nozzle 10 in the ejection amount abnormal state is present. However, there is no limitation thereto. For example, the following procedure may be adopted. That is, in a case that not less than a predetermined number (may be two) of the nozzles 10 in the ejection amount abnormal state are present, the purge process is executed. In a case that the number of the nozzles 10 in the ejection amount abnormal state is less than the predetermined number, the process advances to S1205. Further, in the eighth modification, the second recording process is executed in a case that at least one nozzle 10 in the high viscosity abnormal state is present. However, there is no limitation thereto. For example, the following procedure may be adopted. That is, in a case that not less than a predetermined number (may be two) of the nozzles 10 in the high viscosity abnormal state are present, the second recording process is executed. In a case that the number of the nozzles 10 in the high viscosity abnormal state is less than the predetermined number, the first recording process is executed.

Further, in the foregoing description, the explanation has been made assuming that the ejection state of the nozzle 10 is the first high viscosity abnormal state in a case that the ejection state signal, which is outputted when the ejection driving is performed, is the second ejection state signal. However, there is no limitation thereto. For example, in a case that the ejection state of the nozzle 10 is the deviation abnormal state in which any deviation arises in relation to the ink ejecting direction, the ejection state signal, which is outputted when the ejection driving is performed, is also the second ejection state signal. Then, the process, which is the same as or equivalent to the process performed when the ejection state is the first high viscosity abnormal state as explained in the foregoing exemplary case, is also performed when the ejection state of the nozzle 10 is the deviation abnormal state. Accordingly, the nozzle 10 in the deviation abnormal state can be recovered, and/or the ink, which is ejected from the nozzle 10 in the deviation abnormal state, can be landed at the appropriate position on the recording paper S.

Further, in the foregoing exemplary case, the condition, which is set in order to determine the ejection state, is the combination of the condition that the voltage value of the ejection state signal becomes not less than the threshold value Vmax and the condition that the voltage value of the ejection state signal becomes not more than the threshold value Vmin. However, there is no limitation thereto.

For example, the condition, which is set for the ejection state signal, may be only one of the condition that the voltage value of the ejection state signal becomes not less than the threshold value Vmax and the condition that the voltage value of the ejection state signal becomes not more than the threshold value Vmin. Alternatively, for example, the condition, which is set to determine the ejection state signal, may be such a condition that the difference between the maximum value and the minimum value of the voltage value of the ejection state signal is not less than a threshold value.

Further, in the foregoing exemplary case, in order to determine the ejection state signal, the same threshold value Vmax is set for the periods T1*a* to T4*a*, and the same threshold value Vmin is set for the periods T1*b* to T4*b*. Accordingly, all of the first to fourth conditions are the same condition as each other. However, there is no limitation thereto. The threshold value set for at least one of the periods T1*a* to T4*a* may be different from the threshold value set for other of the periods T1*a* to T4*a*, and/or the threshold value set for at least one of the periods T1*b* to T4*b* may be different from the threshold value set for other of the periods T1*b* to T4*b*. In this case, at least one condition of the first to fourth conditions is different from the other of the first to fourth conditions.

Further, the first to fourth conditions may be conditions, in relation to at least one of the maximum value and the minimum value (that is, the maximum value and/or the minimum value) of the ejection state signal, different from each other. In this case, all of the first to fourth conditions may be the same condition, or at least one of the first to fourth conditions may be different from the other of the first to fourth conditions.

Further, in the foregoing exemplary case, the timing, at which the period T1*a* ends, is the same timing as the timing at which the period T2*a* starts. The timing, at which the period T1*b* ends, is the same timing as the timing at which the period T2*b* starts. However, there is no limitation thereto. In a ninth modification, as depicted in FIG. 17A, the period T2*a* starts before the period T1*a* ends, and a part of the period T1*a* is overlapped with a part of the period T2*a*. Further, the period T2*b* starts before the period T1*b* ends, and a part of the period T1*b* is overlapped with a part of the period T2*b*.

Also in this case, there is no interval between the period T1*a* and the period T2*a* and between the period T1*b* and the period T2*b*. Therefore, the process to be performed thereafter is varied between the case in which the ejection state signal outputted when the ejection driving is performed is the first ejection state signal and the case in which the ejection state signal outputted when the ejection driving is performed is the second ejection state signal, and thus it is possible to execute the appropriate process depending on whether the ink is normally ejected from the nozzle 10 or the first high viscosity abnormal state is given.

In a tenth modification, as depicted in FIG. 17B, the period T2*a* starts after the period T1*a* ends, and there is an interval (a blank, or brank period) between the period T1*a* and the period T2*a*. Further, the period T2*b* starts after the period T1*b* ends, and there is an interval between the period T1*b* and the period T2*b*.

Also in this case, the process to be performed thereafter is varied between the case in which the ejection state signal outputted when the ejection driving is performed is the first ejection state signal and the case in which the ejection state signal outputted when the ejection driving is performed is the second ejection state signal, and thus it is possible to execute the appropriate process depending on whether the ink is normally ejected from the nozzle 10 or the first high viscosity abnormal state is given.

The relationship between the period T2*a* and the period T3*a* and the relationship between the period T2*b* and the period T3*b* in the sixth modification and the relationship between the period T4*a* and the period T1*a* and the relationship between the period T4*b* and the period T1*b* in the seventh modification may be the relationships which are the same as or equivalent to those explained in the ninth and tenth modifications.

Further, in the foregoing exemplary case, the printer 1 performs the suction purge as the purge. However, there is no limitation thereto. For example, a pressurizing pump, which pressurizes the ink contained in the ink-jet head 4, may be provided, for example, at a flow passage between the ink cartridge 15 and the ink-jet head 4. Then, it is also adoptable to perform the pressurizing purge in which the ink contained in the ink-jet head 4 is discharged by driving the pressurizing pump in a state that the plurality of nozzles 10 are covered with the cap 71.

Note that when the pressurizing purge is performed in place of the suction purge in the embodiment described above, the pressurizing purge is an example of a "first discharging operation", and the cap 71 and the pressurizing pump for performing the pressurizing purge constitute an example of a "first discharger". On the other hand, when the pressurizing purge is performed in place of the suction purge in the second and fifth modifications, the cap 71 and the pressurizing pump for performing the pressurizing purge constitute an example of a "purger".

Alternatively, it is also adoptable to perform both of the suction purge based on the driving of the suction pump 72 and the pressurizing purge based on the driving of the pressurizing pump described above. When both of the suction purge and the pressurizing purge are performed in the embodiment described above, the combination of the suction purge and the pressurizing purge is an example of a "first discharging operation", and the maintenance unit 8 and the pressurizing pump, which are used to perform the suction purge and the pressurizing purge, constitute an example of a "first discharger (first discharging means, first discharging unit)". On the other hand, when both of the suction purge and the pressurizing purge are performed in the second and fifth modifications, the maintenance unit 8 and the pressurizing pump, which are used to perform the suction purge and the pressurizing purge, constitute an example of a "purger".

Further, in the foregoing exemplary case, the ejection state is determined on the basis of the signal outputted from the signal processing circuit 78 depending on the change of the voltage of the electrode 76 arranged in the cap 71 when the ink-jet head 4 is caused to perform the driving for inspection. However, there is no limitation thereto.

For example, an electrode, which extends in the vertical direction and which is opposed to the space disposed under or below the nozzle 10 in a state that the carriage 2 is positioned at the maintenance position, may be provided in place of the electrode 76. Then, it is also adoptable to output a signal from the signal processing circuit 78 depending on the change of the voltage of the electrode described above when the driving for inspection is performed in the state in which the carriage 2 is positioned at the maintenance position. Then, the ejection state may be determined on the basis of the signal.

Alternatively, for example, it is also adoptable to provide an optical sensor which directly detects the ink ejected from the nozzle 10 in such a state that the carriage 2 is positioned at a predetermined position such as the maintenance position or the like and which outputs a signal depending on the detection result. Then, the ejection state may be determined on the basis of the signal outputted from the optical sensor. The optical sensor is an example of a "signal outputter".

Alternatively, for example, in the same or similar manner as described in the publication of Japanese Patent No. 4929699, a voltage detection circuit for detecting the voltage change brought about when the ink is ejected from the nozzle may be connected to the plate of the ink-jet head on which the nozzle is formed. The ejection state may be determined on the basis of a signal outputted from the voltage detection circuit when the operation is performed to eject the ink from the nozzle in a state that the carriage has been moved to the inspection position.

Alternatively, for example, in the same or similar manner as described in the publication of Japanese Patent No. 6231759, the substrate of the ink-jet head may be provided with a temperature detecting element. Then, a heater is driven while applying a first applied voltage in order to eject the ink, and then the heater is driven while applying a second applied voltage so that the ink is not ejected, wherein a signal may be outputted depending on whether or not the nozzle 10 undergoes first to third high viscosity abnormal states, on the basis of the change of the temperature detected by the temperature detecting element during a period until a predetermined time elapses after applying the second applied voltage. Then, the ejection state may be determined on the basis of the signal.

Further, in the foregoing exemplary case, the ejection state is determined, by performing the driving for inspection, for all of the nozzles 10 of the ink-jet head 4. However, there is no limitation thereto. The ejection state may be determined, by performing the driving for inspection, for only some of the nozzles 10 of the ink-jet head 4, for example, every other nozzle 10 of each of the nozzle arrays 9. Then, as for the other nozzles 10, the ejection state of the nozzle 10 may be estimated on the basis of the determination result for some of the nozzles 10 described above.

Further, in the embodiment described above, the exemplary case has been explained, in which the present disclosure is applied to the printer provided with the so-called serial head which ejects the ink from the plurality of nozzles while moving in the scanning direction together with the carriage. However, there is no limitation thereto. It is also possible to apply the present disclosure, for example, to a printer provided with a so-called line head which extends over the entire length of the recording paper in the scanning direction and which has a plurality of nozzles arranged in the scanning direction.

Further, in the foregoing description, the exemplary case has been explained, in which the present disclosure is applied to the printer for performing the recording on the recording paper S by ejecting the ink from the nozzle. However, there is no limitation thereto. The present disclosure is also applicable to any printer for recording an image on a recording medium other than the recording paper, including, for example, T-shirt, sheet for outdoor advertisement, case for mobile or portable terminal such as smartphone or the like, corrugated cardboard, and resin member. Further, the present disclosure is also applicable to any liquid ejection apparatus for ejecting any liquid droplet other than the ink, including, for example, liquid droplets of resin and metal in liquid states.

What is claimed is:

1. A liquid ejection apparatus comprising:

a liquid ejection head which has a nozzle and which is configured to eject a liquid from the nozzle;

a signal outputter configured to output an ejection state signal corresponding to an ejection state of the nozzle in a case that ejection driving for ejecting the liquid from the nozzle is performed in the liquid ejection head; and a controller, wherein:

the ejection state signal, outputted from the signal outputter, is a first ejection state signal or a second ejection state signal, depending on the ejection state of the nozzle, the first ejection state signal being a signal which fulfills a first condition regarding a maximum value and/or a minimum value of the ejection state signal in a first period and which does not fulfill a second condition regarding the maximum value and/or the minimum value of the ejection state signal in a second period after the first period; the second ejection state signal being a signal which does not fulfill the first condition in the first period and which fulfills the second condition in the second period; and the controller is configured to:

cause the liquid ejection head to perform the ejection driving; and vary a process to be performed after the ejection driving between a case in which the ejection state signal outputted in a case that the ejection driving is performed is the first ejection state signal and a case in which the ejection state signal outputted in the case that the ejection driving is performed is the second ejection state signal.

2. The liquid ejection apparatus according to claim 1, wherein the ejection state signal, outputted from the signal outputter, is the first ejection state signal, or the second ejection state signal, or a third ejection state signal, depending on the ejection state of the nozzle, the third ejection state signal being a signal which does not fulfill the first condition in the first period and which does not fulfill the second condition in the second period; and the controller is configured to vary the process to be performed after the ejection driving between the case in which the ejection state signal outputted in the case that the ejection driving is performed is the second ejection state signal and a case in which the ejection state signal outputted in the case that the ejection driving is performed is the third ejection state signal.

3. The liquid ejection apparatus according to claim 2, comprising:

a first discharger configured to perform a first discharging operation for discharging the liquid from the nozzle, wherein the controller is configured to cause the first discharger to perform the first discharging operation, in the case in which the ejection state signal outputted in the case that the ejection driving is performed is the third ejection state signal.

4. The liquid ejection apparatus according to claim 3, comprising a second discharger configured to perform a second discharging operation for discharging the liquid from the nozzle, an amount of the liquid discharged in the second discharging operation being smaller than an amount of the liquid discharged in the first discharging operation, wherein the controller is configured to cause the second discharger to perform the second discharging operation, in the case in which the ejection state signal outputted in the case that the ejection driving is performed is the second ejection state signal.

5. The liquid ejection apparatus according to claim 2, comprising a purger configured to perform purging for discharging the liquid from the nozzle being a plurality of nozzles, wherein the controller is configured to:

cause the liquid ejection head to perform the ejection driving with respect to each of the plurality of nozzles; and cause the purger to perform the purging, in a case that a number of a nozzle, of the plurality of nozzles, of which the ejection state signal outputted in a case that the ejection driving is performed is the third ejection state signal, is not less than a predetermined number.

6. The liquid ejection apparatus according to claim 2, further comprising a purger configured to perform purging for discharging the liquid from the nozzle being a plurality of nozzles wherein:

the controller is configured to:

cause the liquid ejection head to perform the ejection driving for each of the plurality of nozzles at a predetermined time;

cause the liquid ejection head to perform flushing for discharging the liquid from a nozzle, of the plurality of nozzles, of which the ejection state signal outputted in a case that the ejection driving is performed is the second ejection state signal and a nozzle, of the plurality of nozzles, of which the ejection state signal outputted in the case that the ejection driving is performed is the third ejection state signal, immediately after the ejection driving; and if the nozzle of which the ejection state signal outputted in the case that the ejection driving is performed is the third ejection state signal exists, cause the purger to perform the purging before starting ejection of the liquid to an ejection objective medium, in a case that an ejection instruction signal instructing the liquid ejection apparatus to eject the liquid is received firstly after the performing of the flushing.

7. The liquid ejection apparatus according to claim 2, wherein:

the nozzle is a plurality of nozzles;

the controller is configured to:

cause the liquid ejection head to perform first ejection driving being the ejection driving for each of the plurality of nozzles;

cause the liquid ejection head to perform first flushing for discharging the liquid from a nozzle, of the plurality of nozzles, of which the ejection state signal outputted in a case that the first ejection driving is performed is the second ejection state signal and a nozzle, of the plurality of nozzles, of which the ejection state signal outputted in the case that the first ejection driving is performed is the third ejection state signal;

cause the liquid ejection head to perform second ejection driving being the ejection driving for a nozzle, of the plurality of nozzles, for which the first flushing has been performed, after the first flushing;

cause the liquid ejection head to perform second flushing for discharging the liquid from a nozzle, of the plurality of nozzle, of which the ejection state signal outputted in a case that the second ejection driving is performed is the second ejection state signal without discharging the liquid from a nozzle, of the plurality of nozzles, of which the ejection state signal outputted in the case that the second ejection driving is performed is the third ejection state signal; and cause the liquid ejection head to perform third ejection driving being the ejection driving for a nozzle, of the plurality of nozzles, for which the second flushing has been performed, after the second flushing.

8. The liquid ejection apparatus according to claim 1, wherein the ejection state signal, outputted from the signal outputter, is the first ejection state signal, or the second ejection state signal, or a fourth ejection state signal, depending on the ejection state of the nozzle, the fourth ejection state signal being a signal which fulfills the first condition in the first period and which fulfills the second condition in the second period; and the controller is configured to vary the process to be performed after the ejection driving between the case in which the ejection state signal outputted in the case that the ejection driving is performed is the second ejection state signal and a case in which the ejection state signal outputted in the case that the ejection driving is performed is the fourth ejection state signal.

9. The liquid ejection apparatus according to claim 1, wherein a part of the first period and a part of the second period are overlapped with each other.

10. The liquid ejection apparatus according to claim 1, wherein a timing at which the first period ends is same as a timing at which the second period starts.

11. The liquid ejection apparatus according to claim 1, wherein the second condition is same as the first condition.

12. The liquid ejection apparatus according to claim 1, wherein the ejection state signal, outputted from the signal outputter, is the first ejection state signal, or the second ejection state signal, or a fifth ejection state signal, depending on the ejection state of the nozzle, the fifth ejection state signal being a signal which does not fulfill the first condition in the first period, which does not fulfill the second condition in the second period, and which fulfills a third condition regarding the maximum value and/or the minimum value of the ejection state signal in a third period after the second period; and the controller is configured to vary the process to be performed after the ejection driving between the case in which the ejection state signal outputted in the case that the ejection driving is performed is the second ejection state signal and a case in which the ejection state signal outputted in the case that the ejection driving is performed is the fifth ejection state signal.

13. The liquid ejection apparatus according to claim 12, wherein the third condition is same as the first condition.

14. The liquid ejection apparatus according to claim 1, wherein the ejection state signal, outputted from the signal outputter, is the first ejection state signal, or the second ejection state signal, or a sixth ejection state signal, depending on the ejection state of the nozzle, the sixth ejection state signal being a signal which does not fulfill the first condition in the first period, which does not fulfill the second condition in the second period, and which fulfills a fourth condition regarding the maximum value and/or the minimum value of the ejection state signal in a fourth period before the first period; and the controller is configured to vary the process to be performed after the ejection driving between the case in which the ejection state signal outputted in the case that the ejection driving is performed is the second ejection state signal and a case in which the ejection state signal outputted in the case that the ejection driving is performed is the sixth ejection state signal.

15. The liquid ejection apparatus according to claim 14, wherein the fourth condition is same as the first condition.

16. The liquid ejection apparatus according to claim 1, wherein:

the nozzle is a plurality of nozzles; and the controller is configured to:

cause the liquid ejection head to perform the ejection driving for each of the plurality of nozzles;

cause the liquid ejection head to perform flushing for discharging the liquid from a nozzle, of the plurality of nozzles, of which the ejection state signal outputted in a case that the ejection driving is performed is the second ejection state signal; and cause the liquid ejection head to perform the ejection driving for at least the nozzle for which the flushing has been performed, after the flushing.

17. The liquid ejection apparatus according to claim 1, wherein, in a case that an ejection instruction signal instructing the liquid ejection apparatus to eject the liquid to an ejection objective medium is received, the controller is configured to execute:

a first ejection process of causing the liquid ejection head to eject the liquid from the nozzle to the ejection objective medium in a case in which the ejection state signal outputted in a case that the ejection driving is performed lastly before the receiving of the ejection instruction signal is the first ejection state signal; and a second ejection process of causing the liquid ejection head to eject the liquid from the nozzle to the ejection objective medium in an aspect different from an aspect of the first ejection process, in a case in which the ejection state signal outputted in the case that the ejection driving is performed lastly before the receiving of the ejection instruction signal is the second ejection state signal.

18. The liquid ejection apparatus according to claim 1, wherein:

the first ejection state signal is the ejection state signal which fulfills the first condition in the first period, which does not fulfill the second condition in the second period, and which does not fulfill a third condition regarding the maximum value and/or the minimum value of the ejection state signal in a third period after the second period;

the second ejection state signal is the ejection state signal which does not fulfill the first condition in the first period, which fulfills the second condition in the second period, and which does not fulfill the third condition in the third period; and the controller is configured to cause the liquid ejection head to perform the ejection driving again in a case in which the ejection state signal outputted in the case that the ejection driving is performed is a seventh ejection state signal which fulfills the first condition in the first period, which does not fulfill the second condition in the second period, and which fulfills the third condition in the third period.

19. The liquid ejection apparatus according to claim 1, wherein:

the first ejection state signal is the ejection state signal which fulfills the first condition in the first period, which does not fulfill the second condition in the second period, and which does not fulfill a third condition regarding the maximum value and/or the minimum value of the ejection state signal in a third period after the second period;

the second ejection state signal is the ejection state signal which does not fulfill the first condition in the first period, which fulfills the second condition in the second period, and which does not fulfill the third condition in the third period; and the controller is configured to cause the liquid ejection head to perform the ejection driving again in a case in which the ejection state signal outputted in the case that the ejection driving is performed is an eighth ejection state signal which fulfills the first condition in the first period, which fulfills the second condition in the second period, and which fulfills the third condition in the third period.

20. A control method for a liquid ejection apparatus, the liquid ejection apparatus including:

a liquid ejection head which has a nozzle and which is configured to eject a liquid from the nozzle; and a signal outputter configured to output an ejection state signal corresponding to an ejection state of the nozzle in a case that ejection driving for ejecting the liquid from the nozzle is performed in the liquid ejection head;

the method comprising:

causing the liquid ejection head to perform the ejection driving; and varying a process to be performed after the ejection driving between a case in which the ejection state signal outputted in a case that the ejection driving is performed is a first ejection state signal and a case in which the ejection state signal outputted in the case that the ejection driving is performed is a second ejection state signal, the first ejection state signal being a signal which fulfills a first condition regarding a maximum value and/or a minimum value of the ejection state signal in a first period and which does not fulfill a second condition regarding the maximum value and/or the minimum value of the ejection state signal in a second period after the first period; the second ejection state signal being a signal which does not fulfill the first condition in the first period and which fulfills the second condition in the second period.

21. A liquid ejection apparatus comprising:

a liquid ejection head which has a nozzle and which is configured to eject a liquid from the nozzle;

a signal outputter configured to output an ejection state signal corresponding to an ejection state of the nozzle in a case that ejection driving for ejecting the liquid from the nozzle is performed in the liquid ejection head; and a controller, wherein:

the ejection state signal, outputted from the signal outputter, is a first ejection state signal or a second ejection state signal, depending on the ejection state of the nozzle, the first ejection state signal being a signal which fulfills a first condition regarding a maximum value and/or a minimum value of the ejection state signal in a first period and which does not fulfill a second condition regarding the maximum value and/or the minimum value of the ejection state signal in a second period after the first period; the second ejection state signal being a signal which does not fulfill the first condition in the first period and which fulfills the second condition in the second period; and the controller is configured to:

cause the liquid ejection head to perform the ejection driving;

determine whether the ejection state signal outputted in a case that the ejection driving is performed is the first ejection state signal or the second ejection state signal; and determine that the ejection state of the nozzle is a normal state in a case that the ejection state signal outputted in the case that the ejection driving is performed is determined to be the first ejection state signal, and that the ejection state of the nozzle is an abnormal state in a case that the ejection state signal outputted in the case that the ejection driving is performed is determined to be the second ejection state signal.

* * * * *